United States Patent
Domb et al.

(10) Patent No.: US 10,772,330 B2
(45) Date of Patent: Sep. 15, 2020

(54) CONTROLLED RELEASE N-HALAMINE POLYMERS FOR WATER DECONTAMINATION AND DETOXIFICATION

(71) Applicant: WETEQ S.A., Luxembourg (LU)

(72) Inventors: Abraham Domb, Jerusalem (IL); Shady Farah, Kfar-Yassif (IL)

(73) Assignee: YISSUM RESEARCH DEVELOPMENT COMPANY, Jerusalem (IL)

( * ) Notice: Subject to any disclaimer, the term of this patent is extended or adjusted under 35 U.S.C. 154(b) by 79 days.

(21) Appl. No.: 15/767,108

(22) PCT Filed: Oct. 7, 2016

(86) PCT No.: PCT/EP2016/074091
§ 371 (c)(1),
(2) Date: Apr. 9, 2018

(87) PCT Pub. No.: WO2017/060485
PCT Pub. Date: Apr. 13, 2017

(65) Prior Publication Data
US 2019/0069555 A1    Mar. 7, 2019

Related U.S. Application Data

(60) Provisional application No. 62/238,202, filed on Oct. 7, 2015.

(51) Int. Cl.
*A01N 43/90* (2006.01)
*A01N 37/30* (2006.01)
(Continued)

(52) U.S. Cl.
CPC .............. *A01N 43/90* (2013.01); *A01N 37/30* (2013.01); *A01N 43/54* (2013.01); *A01N 47/28* (2013.01);
(Continued)

(58) Field of Classification Search
CPC ........ A01N 43/90; A01N 37/30; A01N 43/54; A01N 47/28; A01N 47/44; A01N 59/00;
(Continued)

(56) References Cited

U.S. PATENT DOCUMENTS

| | | | |
|---|---|---|---|
| 5,019,400 A | 5/1991 | Gombotz | |
| 8,211,361 B2 * | 7/2012 | Sun | ........................ A01N 37/28 422/28 |
| 2009/0318659 A1 * | 12/2009 | Chang | ................ C08G 18/3829 528/271 |

OTHER PUBLICATIONS

Gutman, O., Natan, M., Banin, E., Margel, S., Characterization and antibacterial properties of N-halamine-derivatized cross-linked polymethacrylamide nanoparticles, Biomaterials, 2014, 35(19), 5079-87 (Year: 2014).*

(Continued)

*Primary Examiner* — James C Goloboy
(74) *Attorney, Agent, or Firm* — Pabst Patent Group LLP

(57) ABSTRACT

Polymers containing nitrogen-halogen covalent bonds, i.e., N-halamine polymers, are provided for use in water treatment by reducing or removing microbes and toxic chemicals. Polymers containing one or more amide groups, guanidino groups, or groups derived from urethane or urea, are directly halogenated. The hydrolysis of N-halamine bonds is closely monitored by the presence of different electron-donating or electron-withdrawing groups adjacent to the nitrogen(s) of the N-halamine groups, and the resultant polymer can be facilely reloaded with halogen. Released halogen is in the form of an oxidative halogen or a hypohalous acid, in an effective amount and in an extended (Continued)

period of time, to significantly reduce the amount of a wide range of microbes including *Escherichia coli* and bacteriophage MS2 in contaminated water. Sponges, beads, resins, gel, and membranes made from these polymers are used in water treatment.

22 Claims, 5 Drawing Sheets

(51) Int. Cl.
    *A01N 43/54*     (2006.01)
    *A01N 47/28*     (2006.01)
    *A01N 47/44*     (2006.01)
    *C02F 1/50*     (2006.01)
    *C02F 1/76*     (2006.01)
    *A01N 59/00*     (2006.01)
    *C08K 3/015*     (2018.01)
    *C02F 1/56*     (2006.01)

(52) U.S. Cl.
    CPC ............ *A01N 47/44* (2013.01); *A01N 59/00* (2013.01); *C02F 1/50* (2013.01); *C02F 1/76* (2013.01); *C08K 3/015* (2018.01); *C02F 1/56* (2013.01); *C02F 1/766* (2013.01); *C02F 2305/08* (2013.01); *Y02W 10/37* (2015.05)

(58) Field of Classification Search
    CPC ... C08K 3/015; C02F 1/50; C02F 1/56; C02F 1/76; C02F 1/766; C02F 2305/08
    See application file for complete search history.

(56) References Cited

OTHER PUBLICATIONS

Barnes, K., Liang, J., Worley, S.D., Lee, J., Broughton, R.M, Huang, T.S., "Modification of Silica Gel, Cellulose, and Polyurethane with a Sterically Hindered N-Halamine Moiety to Produce Antimicrobial Activity", J. Appl. Polymer Sci., 105(4), 2007, (Year: 2007).*
Farah, S., Aviv, O., Laout, N., Ratner, S., Domb, A.J., "Antimicrobial N-brominated hydantoin and uracil grafted polystyrene beads", Journal of Controlled Release, 216, 2015, 18-29 (Year: 2015).*
Akdag, et al., "The Stabilities of N—Ci Bonds in Biocidal Materials", J. Chem. Theory Comput., 2:879-84 (2006).
Bromberg, et al., "Degradation of Chemical Threats by Brominated Polymer Networks", Ind. & Engineering Chem. Res., 53:18761-74 (2014).
Chen, et al., "Antimicrobial polymers containing melamine derivatives. II. Biocidel polymers derived from 2☐vinyl☐4, 6☐diamino☐1, 3, 5☐triazine", J. Polym. Sci. Part A: Polym. Chem., 43:4089-98 (2005).
Chen, et al., "Biocidal Polystyrenehydantoin Beads. 2. Control of Chlorine Loading", Ind. Eng. Chem. Res, 42:5715-20 (2003).
Eknoian, et al., "Monomeric and polymeric N-halamine disinfectants", Ind. Eng. Chem. Res., 37:2873-7 (1998).
Eknoian, et al., "New Biocidal N-Halamine-PEG", Polymer, 40:1367-1371 (1999).
Elrod, et al., "A Novel Biocidal Elastomer", Rub. Chem. Tech., 74:331-337 (2001).
Farah, et al., "N-bromo-hydantoin grafted polystyrene beads: Synthesis and Nano-micro beads characteristics for achieving controlled release of active oxidative bromine and extended microbial inactivation efficiency", J Poly Sci, Part A: Polymer Chemistry, 54(5):596-610 (2015a).
Grunzinger, et al., "Biocidel activity of hydantoin-containing polyurethane polymeric surface modifiers", Polym. J., 48:4653-62 (2007).
Kenawy, et al., "The chemistry and applications of antimicrobial polymers: a state-of-the-art review", Biomacromolecules, 8:1359-84 (2007).
Liang, et al., "Fabric treated with antimicrobial N-halamine epoxides", Ind. Eng. Chem. Res., 46:6425-9 (2007a).
Liang, et al., "N-halamine biocidal coatings", J. Ind. Microbiol. Biotechnol, 34:157-163 (2007b).
Lin, et al., "Antimicrobial treatment of nylon", J. Appl. Polym. Sci., 81:943-7 (2001).
Lin, et al., "Biocidal polyester", J. Appli. Polym. Sci., 85:177-82 (2002).
Makal, et al., "Polyurethane biocidel polymeric surface modifiers", Biomaterials, 27:1316-26 (2006).
Natan, et al., "Killing Mechanism of Stable N-Halamine Cross-Linked Polymethacrylamide Nanoparticles That Selectively Target Bacteria", AGS Nano, (2):1175-88 (2015).
Panangala, et al., "Inactivation of rotavirus by new polymeric water disinfectants", Virol. Meth., 66:263-268 (1997).
Ren, et al., "Antimicrobial efficacy and light stability of N-halamine siloxanes bound to cotton", Cellulose, 15:593-598 (2008).
Sun, et al, "Novel refreshable N-halamine polymeric biocides containing imidazolidin-4-one derivatives", J. Polym. Sci. A., 39:3073-94 (2001).
Sun, et al., "An N-halamine-based rechargeable antimicrobial and biofilm controlling polyurethane", Acta Biomaterialia, 8(4);1498-506 (2011).
Sun, et al., "Chemistry of Durable and Regenerable Biocidal Textiles", J. Chem. Educ., 82:60-64 (2005).
Ware, "The chemistry of the hydantoins", Chem. Rev., 46(3):403-70 (1950).
Yan, et al., "High-efficacy antibacterial polymeric micro/nano particles with N-halamine functional groups", Chem. Eng. J., 254:30-8 (2014).
Yan, et al., "Porous polymeric antimicrobial resin containing N-halamine functional groups", Reactive and Functional Polymers, 96:71-77 (2015).

* cited by examiner (†) DMSO, 2hr. (1:1.5 - Reactive site: DMH or HD)

CONTROLLED RELEASE N-HALAMINE POLYMERS FOR WATER DECONTAMINATION AND DETOXIFICATION

CROSS-REFERENCE TO RELATED APPLICATIONS

This application is a 371 application of PCT/EP2016/074091, filed Oc. 7, 2016, which claims priority to and benefit of U.S. Provisional Application No. 62/238,202, filed Oct. 7, 2015, which is hereby incorporated herein by reference in its entirety.

FIELD OF THE INVENTION

The disclosed technology is generally in the field of polymeric formulations for water decontamination and detoxification.

BACKGROUND OF THE INVENTION

Extensive efforts have been made to control emerging disease infections transmitted by food, water, or contact (Chen Z, et al., *J. Polym. Sci. Part A: Polym. Chem.*, 43:4089-4098 (2005); Makal U, et al., *Biomaterials*, 27:1316-1326 (2006)). Currently used disinfectants have several limitations including long contact time, bacterial resistance, toxicity, and limited regeneration ability (Eknoian M., et al., *Ind. Eng. Chem. Res.*, 37:2873-2877 (1998)). There is a need for new biocidal compounds which overcome these limitations.

Polymers such as cellulose, nylon, polyethylene terephthalate (PET), and Kraton rubber have been utilized in various industrial and medical applications (Ken X, et al., *Cellulose*, 15:593-598 (2008); Sun. Y, et al, *J. Polym. Sci. A.*, 39:3073-3094 (2001); Lin J, et al., *J. Appl. Polym. Sci.*, 81:943-947 (2001); Lin J, et al., *J. Appli. Polym. Sci.*, 85:177-182 (2002); Elrod DB, et al., *Rub. Chem. Tech.*, 74:331-337 (2001); Eknoian M W, et al., *Polymer*, 40:1367-1371 (1999)). Polymers with biocidal capabilities have been used to disinfect potable water and thereby improve health (Panangala VS, et al., *Virol. Meth.*, 66:263-268 (1997); Liang J, et al., *J. Ind. Microbiol. Biotechnol.*, 34:157-163 (2007)).

N-halamine structures, defined as nitrogen-halogen covalent bonds (Sun Y, et al., *J. Polym. Sci. A: Polym. Chem.*, 39:3073-3084 (2001)), show promise in inactivating Gram-negative and Gram-positive bacteria, viruses, and fungi, through a mechanism involving the direct transfer of positive halogen from N-halamine to appropriate receptors in the bacterial cells (Kenawy E R., et al., *Biomacromolecules*, 8:1359-1384 (2007); Grunzinger S J, et al., *Polym. J.*, 48:4653-4662 (2007); Sun G, et ale, *J. Chem. Ethic.*, 82:60-64 (2005)). Although some efforts have focused on functionalizing polymers with pendant biocidal moieties, there is a need for N-halamine functionalized polymers which possess a high loading capacity for functional moieties and efficiency for N-halamine bonds, allowing for controlled release of safe biocidal/detoxification elements and supporting the replenishments of active elements upon release.

Therefore, it is an object of the present invention to provide compositions for controlled release of biocidal agents from polymers.

It is another object of the present invention to provide a method of water purification using the compositions to inactivate microbes and remove toxic organic molecules.

SUMMARY OF THE INVENTION

N-halamine polymers are provided for use in water treatment by reducing or removing microbes and toxic chemicals. The N-halamine polymer can be made from polymers containing one or more amide, urethane, urea or guanidine groups, or combinations thereof, by direct halogenation, or be made with polymers modified to contain one or more urea-derived groups including heterocyclic rings. These polymers are halogenated to form nitrogen-halogen covalent bonds, and are closely influenced on degradation by any electron-donating or electron-withdrawing group (e.g., alkyl, aryl) adjacent to the nitrogen(s) of the N-halamine groups. In some embodiments, the N-halamine polymer is a halogenated polyurea, polyurethane, polyguanidine, polyamide, or copolymer or block polymer thereof. Preferably, the halogen is bromine, chlorine or a combination thereof, and the percent composition of halogen in the polymer is generally about 5%, 10%, 15%, 20%, 25%, 30%, or greater, as measured by techniques such as elemental analysis.

In some embodiments, the N-halamine polymers have a structure defined by the following formulae:

Formulae 1 and 2

Embodiments of N-halamine polymers.

where Y, independently in each repeating unit, is S, NH or O; X, independently in each repeating unit, is $CR_2$, O, NH, N—Br, or N—Cl; Z, independently in each repeating unit, is NH, N—Br, or N—Cl; $R_1$ is from a polymer carrier or an alkyl group; and R and $R_2$ are alkyl groups, In some embodiments, the N-halamine polymer is modified with one or more urea-derived heterocyclic rings, where nitrogen-halogen covalent bonds are fainted. In some forms, the urea-derived heterocyclic ring is a six-membered ring such as uracil, 6-aminouracil, orotic acid, uric acid, and other uracil derivatives.

In other forms, the urea-derived heterocyclic ring is a five-membered ring such as hydantoin and its derivatives, where nitrogen-halogen covalent bonds are formed.

In other forms, the N-halamine is on an amide bond on the polyamide backbone, such as Nylon 6,6 or a protein, or where the amide moieties are side groups along a polymer backbone such as acryl or methacryl amide copolymers.

The polymers, modified polymers, or polymers that have released halogen content can be halogenated or re-halogenated by simple immersion in the aqueous solution of hypohalous acid. The halogenated polymer can be dried or stored in the aqueous solution.

Upon hydrolysis, the N-halamine polymers release halogen in the form of an oxidative halogen or a hypohalous acid in an effective amount and in an effective period of time to significantly reduce the amount of a wide range of microbes including *Escherichia coli* and bacteriophage MS2 in contaminated water, for example, by a 3-fold, 4-fold, 5-fold, 6-fold, 7-fold, 8-fold, 9-fold, or greater, reduction in the log scale of the number of microbes. The N-halamine polymers can also be processed into microparticles, nanoparticles, beads, sponges, foams, resins, or membranes. Forms such as sponges, resins, and membranes are useful in water treatment. Other forms of the N-halamine polymers can be used as antimicrobial coatings for medical, industrial, and residential purposes.

The release rate of the halogen from the N-halamine derivative is determined by the rate of cleavage of the N—Br or N—Cl in the relevant aqueous media and is dependent on the chemical nature of the N-halamine. An N-halamine of a urethane bond releases the active halogen at a different rate compared to an amide derivative. Within the chemical group there are differences in the N-halamine bond cleavage rate depending on the steric hindrance, withdrawing or attracting electron side groups and accessibility of water molecules. The media where the N-halamine functions affects the activity of N-halamine polymers. The acidity, ionic strength, oxidative conditions, enzymatic activity, irradiation and sun-light, reducing activities and more are factors affecting the activity of N-halamine polymers. The copolymers and blends of N-halamine polymers of different structures are adjusted to obtain desired release rate of oxidative halogen for the polymeric N-halamine at a given environment and type of water.

A method of water treatment by removing or reducing the amount of microbes, toxic chemicals, or both from contaminated water, is also provided, where the contaminated water is contacted with the N-halamine polymers. Generally the N-halamine polymers in the water treatment are in the form of microparticles, nanoparticles, beads, sponges, foams, resins, or membranes. The polymer is contacted with the water to reduce viable microbes by 2-fold, 4-fold, 5-fold, 6-fold, 7-fold, or more, in the log scale. A few grains of N-halamine polymers (e.g., 16 g, 20 g, or 25 g) can significantly reduce the amount of microbes in hundreds of liters of contaminated water. The way water comes in contact with the N-halamine is a factor. N-halamine polymers in a soluble or insoluble form can be added to water for batch decontamination. The N-halamine polymer can be in the form of water insoluble porous beads or a fabric or a hydrogel where water is decontaminated when passing through or coming in contact with these insoluble forms of active N-halamine. The beads can be loaded in a filter for decontamination of passing drinking water. The polymer can be of different structures, comb-like, branched, crosslinked, block or random compolymeer and more. The polymer backbone can be hydrolytically or biologically biodegradable so at the end of the decontamination process, only small molecules remain in the water. The polymers can be also recharged or reloaded with more halogen via a simple immersion with aqueous hypohalous acid.

A preferred embodiment uses the N-halamine polymer in the form of brominated or chlorinated polyurethane beads or sponges. The beads or sponges can have different densities, mesh sizes and polymer molecular weights to provide a range of antimicrobial activities and capabilities for water purification.

Another preferred N-halamine polymer is a brominated or chlorinated polyamide, such as brominated or chlorinated Nylon 6,6 and Nylon 6.

Yet another preferred N-halamine polymer is brominated or chlorinated polyacrylamide or its copolymers. They can be used as antimicrobial agents and flocculants at the same time.

DETAILED DESCRIPTION OF THE INVENTION

I. Definitions

Figure 1:
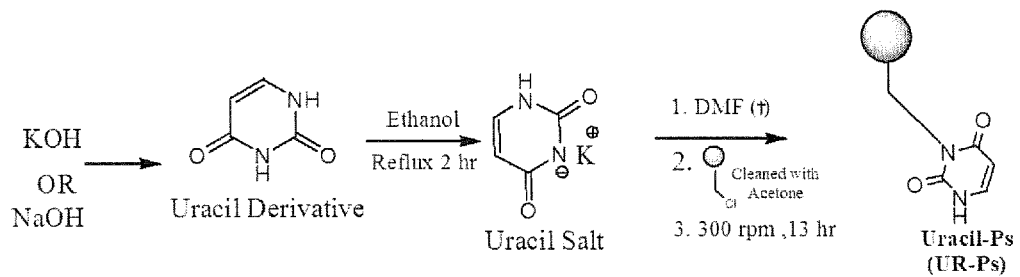
FIG. 1 is a schematic representation of the conjugation of uracil to chloromethyl-modified polystyrene beads via nucleophilic substitution of uracil salt.

The term "N-halamine" refers to nitrogen-halogen covalent bonds.

The term "linker" refers to a substituted or unsubstituted alkyl, alkene, alkyne, or containing polyalkylene oxide such as polyethylene glycol.

The term "substituted" refers to all permissible substituents of the compounds or functional groups described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats.

Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, arylalkyl, substituted arylalkyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, amino acid, poly(lactic-co-glycolic acid), peptide, and polypeptide groups. Such alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, arylalkyl, substituted arylalkyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, amino acid, polylactic-co-glycolic acid), peptide, and polypeptide groups can be further substituted.

Heteroatoms such as nitrogen may have hydrogen substituents and/or any permissible substituents of organic compounds described herein which satisfy the valences of the heteroatoms. It is understood that "substitution" or "substituted" includes the implicit proviso that such substitution is in accordance with permitted valence of the substituted atom and the substituent, and that the substitution results in a stable compound, i.e. a compound that does not spontaneously undergo transformation such as by rearrangement, cyclization, elimination, etc.

The term "Aryl," refers to $C_5$-$C_{26}$-membered aromatic, fused aromatic, fused heterocyclic, or biaromatic ring systems, Broadly defined, "aryl," as used herein, includes 5-, 6-, 7-, 8-, 9-, 10-, 14-, 18-, and 24-membered single-ring aromatic groups, for example, benzene, naphthalene, anthracene, phenanthrene, chrysene, pyrene, corannulene, coronene, etc. "Aryl" further encompasses polycyclic ring systems having two or more cyclic rings in which two or more carbons are common to two adjoining rings (i.e., "fused rings") wherein at least one of the rings is aromatic, e.g., the other cyclic ring or rings can be cycloalkyls, cycloalkenyls, cycloalkynyls, aryls and/or heterocycles.

The term "Alkyl," refers to the radical of saturated aliphatic groups, including straight-chain alkyl, alkenyl, or alkynyl groups, branched-chain alkyl, cycloalkyl (alicyclic), alkyl substituted cycloalkylgroups, and cycloalkyl substituted alkyl. In preferred embodiments, a straight chain or branched chain alkyl has 30 or fewer carbon atoms in its backbone (e.g., $C_1$-$C_{30}$ for straight chains, $C_3$-$C_{30}$ for branched chains), preferably 20 or fewer, more preferably 15 or fewer, most preferably 10 or fewer. Likewise, preferred cycloalkyls have from 3-10 carbon atoms in their ring structure, and more preferably have 5, 6 or 7 carbons in the ring structure. The term "alkyl" (or "lower alkyl") as used throughout the specification, examples, and claims is intended to include both "unsubstituted alkyls" and "substituted alkyls," the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, a hosphinate, amino, amido, amidine, imine, cyano, nitro, azido, sulfhydryl, alkylthio, sulfate, sulfonate, sulfamoyl, sulfoxide, sulfonamido, sulfonyl, heterocyclyl, aralkyl, or an aromatic or heteroaromatic moiety.

1. N-Halamine Structures

The N-halamine polymers have at least one or more amide groups, one or more guanidino groups, one or more groups derived from urethane or urea, or a combination thereof, that are halogenated to form nitrogen-halogen covalent bonds.

The general structure of the polymers has a structure defined by Formulae 1 and 2 as shown above.

i. Halogenated, Urea-Derived Cyclic Molecules

In some embodiments, the one or more groups derived from urethane or urea in the N-halamine polymers have a structure shown in Formula 3,

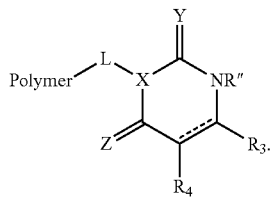

Formula 3

One form of N-halamie polmer having a group derived from urea.

In Formula 3, L is absent or a linker; X is N or CR; Y and Z are independently O, S, or NR'; R" is H, Cl, or Br; R', $R_3$, and $R_4$ are independently hydroxyl, hydrogen, amino, thiol, oxo, phosphate, or substituted or unsubstituted $C_1$-$C_{10}$ alkyl, $C_1$-$C_{10}$ alkylene, $C_2$-$C_{10}$ alkenyl, $C_2$-$C_{10}$ alkynyl, $C_1$-$C_{10}$ alkoxy, $C_1$-$C_{10}$ alkylamino, $C_1$-$C_{10}$ alkylthio, $C_1$-$C_{10}$ carbonyl, $C_1$-$C_{10}$ carboxyl, $C_1$-$C_{10}$ amido, $C_1$-$C_{10}$ sulfonyl, $C_1$-$C_{10}$ sulfonic acid, $C_1$-$C_{10}$ sulfamoyl, $C_1$-$C_{10}$ sulfoxide, $C_1$-$C_{10}$ phosphoryl, or $C_1$-$C_{10}$ phosphonyl, wherein substituents are independently hydroxyl, amino, thiol, oxo, phosphate, or substituted or unsubstituted $C_1$-$C_{10}$ alkyl, $C_1$-$C_{10}$ alkylene, $C_2$-$C_{10}$ alkenyl, $C_2$-$C_{10}$ alkynyl, $C_1$-$C_{10}$ alkoxy, $C_1$-$C_{10}$ alkylamino, $C_1$-$C_{10}$ alkylthio, $C_1$-$C_{10}$ carbonyl, $C_1$-$C_{10}$, carboxyl, $C_1$-$C_{10}$ amido, $C_1$-$C_{10}$ sulfonyl, $C_1$ $C_{10}$ sulfonic acid, $C_1$-$C_{10}$ sulfamoyl, sulfoxide, $C_1$-$C_{10}$ phosphoryl, or $C_1$-$C_{10}$ phosphonyl.

For example, L is absent or a linker; and R" is Cl or Br in Formula 3, resulting structures shown in Formulae 4-6:

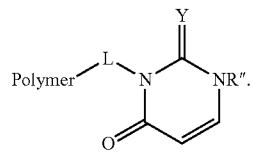

An N-halamine polymer having a halogenated uracil.

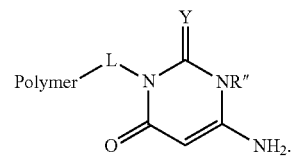

An N-halamine polymer having a halogenated 6-aminouracil.

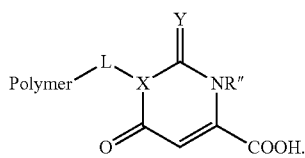

An N-halamine polymer havning a halogenated orotic acid.

In some embodiments, $R_3$ and $R_4$ combine to form a saturated or non-saturated, five- or six-membered ring. For example, $R_3$ and $R_4$ combine to form a five-membered ring having a structure as shown in Formula 7,

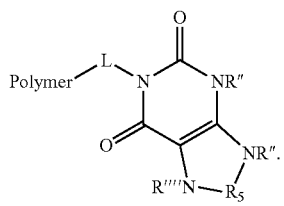

An N-halamine polymer having a halogenated, uric acid or its derivatives.

In Formula 7, L is absent or a linker; R", R''', and R'''' are independently H, Cl, or Br, and at least one of R", R''', and R'''' is not H; $R_5$ is O, S, NR''''', or CR*R**, where R''''', R*, and R** are independently hydrogen or substituted or unsubstituted alkyl, heteroalkyl, alkenyl, heteroalkenyl, alkynyl, heteroalkynyl, cycloalkyl, heterocycloalkyl, cycloalkenyl, heterocycloalkenyl, aryl, heteroaryl, alkylaryl, alkylheteroaryl, arylalkyl, or heteroarylalkyl, wherein substituents are independently hydroxyl, amino, thiol, oxo, phosphate, or substituted or unsubstituted $C_1$-$C_{10}$ alkyl, $C_1$-$C_{10}$ alkylene, $C_2$-$C_{10}$ alkenyl, $C_2$-$C_{10}$ alkynyl, $C_1$-$C_{10}$ alkoxy, $C_1$$C_{10}$ alkylamino, $C_1$-$C_{10}$ alkylthio, $C_1$-$C_{10}$ carbonyl, $C_1$-$C_{10}$ carboxyl, $C_1$-$C_{10}$ amido, $C_1$-$C_{10}$ sulfonyl, $C_1$-$C_{10}$ sulfonic acid, $C_1$-$C_{10}$ sulfamoyl, $C_1$-$C_{10}$ sulfoxide, phosphoryl, or $C_1$-$C_{10}$ phosphonyl. A more preferred structure includes Formula 6, where $R_5$ is C=O.

In other embodiments, the N-halamine polymers are polymers modified to have a structure shown in Formula 8.

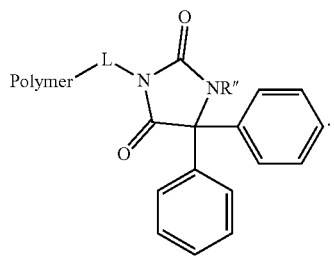

Another form of N-halamine polymers having a group derived from urea.

In Formula 8, L is absent or a linker; X is N or CR; Y and Z are independently O, S, or NR'; R" is H, Cl, or Br; R', $R_6$, and $R_7$ are independently hydroxyl, hydrogen, amino, thiol, oxo, phosphate, or substituted or unsubstituted $C_1$-$C_{10}$ alkyl, $C_1$-$C_{10}$ alkylene, $C_2$-$C_{10}$ alkenyl, $C_2$-$C_{10}$ alkynyl, $C_1$-$C_{10}$ alkoxy, $C_1$-$C_{10}$ alkylamino, $C_1$-$C_{10}$ alkylthio, $C_1$-$C_{10}$ carbonyl, $C_1$-$C_{10}$ carboxyl, $C_1$-$C_{10}$ amido, $C_1$-$C_{10}$ sulfonyl, $C_1$-$C_{10}$ sulfonic acid, $C_1$-$C_{10}$ sulfamoyl, sulfoxide, $C_1$-$C_{10}$ phosphoryl, or $C_1$-$C_{10}$ phosphonyl, wherein substituents are independently hydroxyl, amino, thiol, oxo, phosphate, or substituted or unsubstituted $C_1$-$C_{10}$ alkyl, $C_1$-$C_{10}$ alkylene, $C_2$-$C_{10}$ alkenyl, $C_2$-$C_{10}$ alkoxy, $C_1$-$C_{10}$ alkoxy, $C_1$-$C_{10}$ alkylamino, alkylthio, $C_1$-$C_{10}$ carbonyl, $C_1$-$C_{10}$ carboxyl, $C_1$-$C_{10}$ amido, $C_1$-$C_{10}$ sulfonyl, $C_1$-$C_{10}$ sulfonic acid, $C_1$-$C_{10}$ sulfamoyl, sulfoxide, $C_1$-$C_{10}$ phosphoryl, or $C_1$-$C_{10}$ phosphonyl.

For example, the polymer is conjugated with a urea-derived, five-membered cyclic structure shown in Formula 9 or Formula 10, wherein L is absent or a linker; R" is Cl or Br:

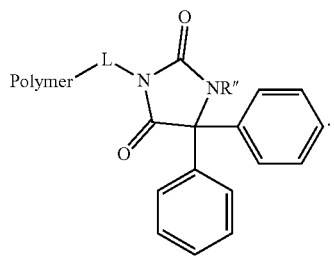

An N-halamine polymer having halogenated, 5,5'-diphenylhydantoin.

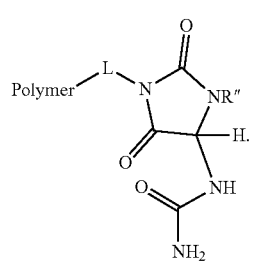

An N-halamine polymer having halogenated allantoin.

ii. Direct Halogenation of Polymers

Polymers containing nitrogen, particularly in its repeating unit, can be directly halogenated, forming halogenated polymers such as brominated or chlorinated polymers with high halogen contents.

For example, halogenated polyurethane having a structure shown in formula 11 possesses a high loading content of bromine, controllably releases hypobromous acid, and exhibits antimicrobial activity.

Formula 11

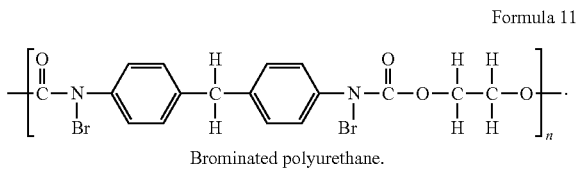

Brominated polyurethane.

Polyguanidine polymers and its derivatives modified to contain N-halamine groups also controllably release hypobromous acid and exhibit antimicrobial activity. For example, polyhexamethylene guanidine is brominated to give a structure shown in Formula 12.

Formula 12

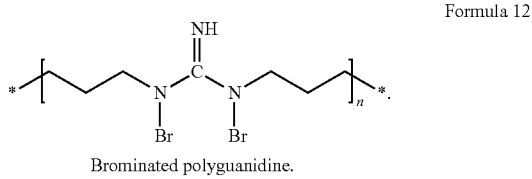

Brominated polyguanidine.

Halogenated polyurea having a structure containing bromine as shown in formula 13, or a structure containing chlorine, possesses a high loading content of bromine, controllably releases hypobromous acid, and exhibits antimicrobial activity.

Formula 13

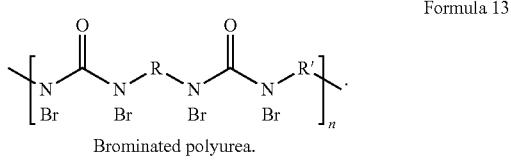

Brominated polyurea.

Halogenated polyamide having a structure containing bromine as shown in formula 14, or a structure containing chlorine, possesses a high loading content of bromine, controllably releases hypobromous acid, and exhibits antimicrobial activity.

Formula 14

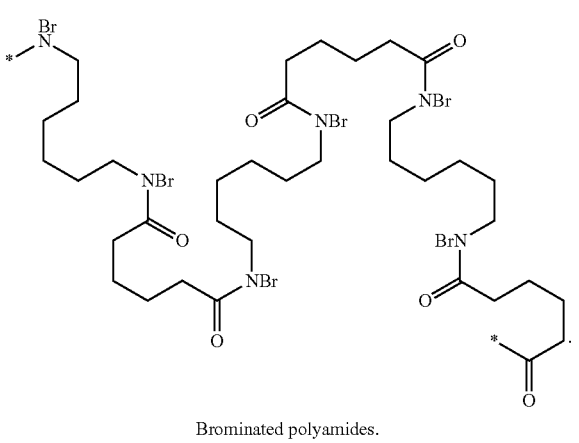

Brominated polyamides.

Copolymers can also be loaded with halogen to provide antimicrobial activity, when polymers having primary amines are crosslinked using guanidine, forming N-halamine groups. For example, polyethylene imine is crosslinked using guanidine, and the resulting guanidine amine is halogenated.

The polymers can contain other functional groups that affect water purification such as hydroxamic acid groups that are capable of chelating multivalent metal ions such as iron or copper ions. The polymer may contain anionic or cationic groups along the polymer chain, in addition to the N-halamine groups.

2. Polymers

Halogenated, preferably chlorinated or brominated, polymers or copolymers can be used as antimicrobial agents. These copolymers can be acrylamide or methacrylamide with vinyl monomers that possess anionic, cationic and non-ionic moieties, such as acrylic acid, dimethylamino ethyl methacrylate, PEG-acrylate, styrene, or other polymers or copolymers that are commonly used for water treatment as flocculants.

These N-halogenated acrylamide derivatives have dual effect, i.e., they are antimicrobial and flocculants such that they provide extended release of active halogens for deactivation or anti-microbial ability, degradation of organic molecules, and act as flocculants for precipitation and removal of particulates and dissolved solids from contaminated water.

Polymer-based flocculants commonly used in water treatment include various molecular weight anionic, nonionic and cationic polymers. These polymers increase the efficiency of settling, clarification, filtration and centrifugation operations. They can be halogenated directly or via a urea-derived cyclic group to achieve controlled release of oxidative halogen or its weak acid and substantially reduce the amount of microbes. These polymers include metallic hydroxides with a polymeric structure (e.g., alum, ferric hydroxide), starch derivatives (e.g., corn or potato-starches, natural starches, anionic oxidized starches or amine treated cationic starches), or other polysaccharides such as alginates, polyacrylamides, polyalkylene imines (e.g., polyethylene-imines), polyamides-amines, polyamines, polyalkylene oxide (e.g., polyethylene-oxide), and polysulfonated compounds.

Other suitable polymers include polymers commonly used in forming membrane materials, such as fiberglass, anopore (ANP), cellulose acetate (CA), cellulose nitrate (CN, nitrocellulose), nylon/polyamide (NYL), polycarbonate (PC), polyethersulfone (PES), polypropylene (PP), and regenerated cellulose (RC).

Derivatives of the N-halamine polymers may also be used. The term "derivative" does not mean that the derivative is synthesized from the parent polymer either as a starting material or intermediate, although this may be the case. The term "derivative" can include salts (for example, human consumption acceptable salts), prodrugs, or metabolites of the parent polymer.

3. Formulations i. Content of Halogen

N-halamine polymers for anti-microbial activity and water detoxification generally contain a high content of halogen, e.g., bromine or chlorine atoms. Compared to unmodified polymers or polymers prior to halogenation, the N-halamine polymers generally have an increase in the wt % or atom number % of a halogen element by about 5%, 10%, 15%, 20%, 25%, 30%, 35%, 40%, 45%, or 50% of the polymer.

Upon water contact, halogen elements are generally released as an oxidative halogen, and the content of halogen elements in the polymer is gradually decreased. The remaining content of halogen wt % or atom % is a function of the surface area of polymer exposed to water, porosity of polymer-based particles, the amount of water, pH and ionic strength of the water, and the presence of other stabilizing or destabilizing agents such as enzyme catalysts, metal ions, reducing agents, external factors such as sunlight and radiation, temperature of the environment and the water and compounds that may react with the N-halamine. For example, the halogen element wt % or atom % content of the polymer can be about 1%, 2%, 3%, 4%, 5%, 6%, 7%, 8%, 9%, 10%, 15%, 20%, or 25%, after elution of 150 liters of water from 16 g of dry N-halamine polymeric microparticles packed in a 28-mm wide column.

After halogen release, the polymer is capable of being modified to reload halogen to an amount that is at least 70%, 80%, 90%, 100%, or 110% of the previous amount of halogen, for one, two, three, four, five, six, seven, eight, nine, ten, or more than ten times.

ii. Release

N-halamine polymers for anti-microbial activity and water detoxification generally release oxidative halogen or weak acid such as hypobromous acid and hypochlorous acid for a sustained period of time and above the level of the required concentration to be effective against microbes and toxic organic molecules. For example, the polymer releases oxidative halogen for 1 hour, 3 hours, 5 hours, 10 hours, 12 hours, 24 hours, 3 days, 5 days, 7 days, 1 month, 2 months, 3 months or more, depending on the flow rate and the amount of water. The polymer releases oxidative halogen at a concentration above the minimal inhibitive concentration against microbes for the period of release time.

Among the three types of N-halamine structures: amine, amide, and imide, the stability of the N—X (X=Cl or Br) bond affects the release of oxidative halogen and thus the anti-microbial activity of the N-halamine polymer. (Chen Y, et al., *Ind. Eng. Chem. Res.* 42:5715-5720 (2003).) Generally, the order of bond strength is amine N—X>amide N—X>imide N—X, and the order of the reactivity of oxidative halogen with receptors on the biological cells is imide N—X>amide N—X>amine N—X. The stability order of the imide and amide moieties can be changed or reversed based upon steric effects of the substituents on the cyclic ring or the electron withdrawing or donating effects of nearby groups. Thus, some affected amide N—X can exhibit both fast inactivation rates and exceptional stability (Akdag A, et al., *J. Chem. Theory Comput.* 2:879-884 (2006)).

iii. Antimicrobial Activity

N-halamine polymers generally release oxidative halogen or its weak acid at a level above the minima inhibition concentration for most bacteria including *E. coli*, fungi, yeast, and bacteriophage for an extended period of time.

Contaminated water or water samples containing microbes, after elution/filtration through resins made with these N-halamine polymers, have a reduced amount of microbes by 1-fold, 2-fold, 3-fold, 4-fold, 5-fold, 6-fold, 7-fold, 8-fold, 9-fold, 10-fold, or greater, in the log scale.

In some forms, directly halogenated polymers, polymers halogenated via a urea-derived group, and a urea-derived cyclic compound containing halogen, can be mixed such that the halogenated polymers encapsulate the halogenated cyclic molecules as biocidal agents. In other forms, polymer is mixed with a urea-derived cyclic compound containing halogen to impart antimicrobial activity. Other antimicrobial agents used in the art may be added.

iv. Detoxification Capability

N-bromo and N-chloro polymeric derivatives are effective to convert aliphatic alcohols into aldehydes and carboxylic acids and to decompose organophosphorus pesticides such as methylparathion, malathion and chlorpyrifos, in aqueous solutions at concentrations of between 0.01 to 1 mM when adding N-chloro or N-bromo dimethyl hydantoin polystyrene beads containing 20% w/w of active chlorine or bromine into the contaminated solutions at room temperature for 2 hours immersion-contact time. The content of native organophosphorus can be determined by HPLC or UV. None of the phosphorus original compounds are detected in the solution after contact with the N-bromo or N-chloro polymer.

Similarly, N-chloro polyacrylamide is able to oxidize organosulfur molecules into the less toxic sulfoxides such as dimethyl sulfide and chloroethyl sulfide and 1-3 bis-(2-chloroethyl)-nitrosourea (BCNU). These sulfoxides may further hydrolyze in water.

Herbicides, pesticides and other active organic contaminants containing functional groups sensitive to oxidation are oxidized and become inactive. Thus oxime carbamate pesticides such as Aldicarb and Methomyl that contain thio bonds rapidly degrade. However, carbaryl and carbofuran, which are aromatic carbamates and do not contain any thio bonds, are not affected by N—Br polyacrylamide.

v. Forms

Generally the N-halatnine polymer is in the form of a powder, microparticles, nanoparticles, beads, or formed into a sponge, a foam, a resin, a gel, a membrane, fabric, fibers or filaments for use in water treatment.

In some forms of N-halamine polymer, the sponge, foam, resin or membrane can be the size of a test tube or the cross-sectional area of a cartridge or a pipe. One or more sponges can be used in a cartridge, where the upstream sponges and the downstream sponges are designed to have different pore sizes to remove large and small contaminants or sediments by filtration. The pore size or mesh size usually ranges from 0.1 µm, 0.5 µm, 1 µm, 5 µm, 10 µm, 50 µm, 100 µm, and larger.

III. Method of Making Controlled Release N-Halamine Polymers

1. Preparation and Processing of N-Halamine Polymers

Polymers containing amide, urethane, urea, and/or imide can be immersed with an aqueous solution of hypobromide or hypochloride. The N-brominated or chlorinated polymer in solution or in a dry form can be stored and used as an antimicrobial agent.

Alternatively, polymers can be modified with a urea-derived compound such as uracil or hydantoin and further halogenated.

The halogenated polymers can be further processed into microparticles, nanoparticles, or absorbed or bound to flocculent materials commonly used in water purification.

Techniques for making particles are known in the art and include, but are not limited to, solvent evaporation, solvent removal, spray drying, phase inversion, low temperature casting, and nanoprecipitation. Suitable methods of particle formulation are briefly described below. As described above, one or more additional antimicrobial agents can also be incorporated into the N-halamine polymeric particles during particle formation.

i. Solvent Evaporation

In this method, the polymeric components are dissolved in a volatile organic solvent, such as methylene chloride. The organic solution is then suspended in an aqueous solution that contains a surface active agent such as polyvinyl alcohol). The resulting emulsion is stirred until most of the organic solvent evaporated, leaving solid nanoparticles. The resulting nanoparticles are washed and dried overnight in a lyophilizer. Particles with different sizes and morphologies can be obtained by this method.

ii. Solvent Removal

In this method, N-halamine polymers are dispersed or dissolved in a suitable solvent. This mixture is then suspended by stirring in an organic oil (such as silicon oil) to form an emulsion. Solid particles form from the emulsion, which can subsequently be isolated from the supernatant. This method can also be used to make membranes and coatings.

iii. Spray Drying

In this method, the N-halamine polymers are dispersed or dissolved in a suitable solvent. The solution is pumped through a micronizing nozzle driven by a flow of compressed gas, and the resulting aerosol is suspended in a heated cyclone of air, allowing the solvent to evaporate from the microdroplets, forming particles. This process can also be used to make membranes and coatings.

iv. Phase Inversion

In this method, the N-halamine polymers are dispersed or dissolved in a "good" solvent, and the solution is poured into a strong non solvent for N-halamine polymer to spontaneously produce, under favorable conditions, particles.

v. Low Temperature Casting

Methods for very low temperature casting of particles are described in U.S. Pat. No. 5,019,400 to Gombotz et al. In this method, the N-halamine polymer is dispersed or dissolved is a solvent. The mixture is then atomized into a vessel containing a liquid non-solvent at a temperature below the freezing point of the solution which freezes the N-halamine polymer as tiny droplets. As the droplets and non-solvent for the components are warmed, the solvent in the droplets thaws and is extracted into the non-solvent, hardening the particles.

2. Halogenation of Resins or Micro/Nano-Beads

The surface and/or interior pores of polymeric micro and/or nanobeads can be halogenated. These polymer-based beads may contain amine, amide, or imine, or may be modified to be able to react with a urea-derived cyclic compound.

These polymer-based beads can be immersed into an aqueous solution of hypobromide or hypochloride. The N-brominated or chlorinated beads can then be stored and used as an antimicrobial agent in solution or in a dry form.

Alternatively, techniques for surface coating are known in the art such as electrospray, and can be used in the halogenation of polymeric micro/nano-beads.

IV. Use of Controlled Release N-Halamine Polymers

1. Water Purification

The N-halamine polymers can be used in water treatment to reduce the amount of microbes and remove toxic organic molecules. The N-halamine polymers may have a dual effect, i.e., they are antimicrobial and flocculants, such that they provide extended release of active halogens for deactivation or anti-microbial ability, degradation of organic molecules, and acts as flocculent for precipitation and removal of particulates and dissolved solids from contaminated water.

The N-halamine polymers can be used as resins or sponges in water treatment. In other forms, N-halamine polymeric membranes are used in water purification.

The N-halamine polymers can be added to water in a soluble or insoluble form for batch decontamination. The N-halamine polymer can be in the form of water insoluble porous beads or a fabric or a hydrogel where water is decontaminated when passing through or coming in contact with these insoluble forms of active N-halamine. The beads can be loaded in a filter for decontamination of passing drinking water. The polymer can be of different structures, comb-like, branched, crosslinked, block or random copolymer and more. The polymer backbone can be hydrolytically or biologically biodegradable so at the end of the decontamination process, only small molecules remain in the water.

2. Antimicrobial Coatings

Another way to use the N-halamine polymers is to form antimicrobial coatings. In some the N-halamine polymers are used in a healthcare setting for sterilization of medical devices to prevent hospital associated infection, to disinfect surfaces, or as coatings or sprays on disposal paper or polymeric sheets, clothing, or instruments.

The N-halamine polymers can also be used in clinics, industry, and residential space.

3. Absorbent for Odor Removal

The N-halamine polymer can also be mixed in powder or granular form with an absorbent or filler material to provide a treatment composition for removal of noxious odor. The absorbent material is generally a superabsorbent polymer such as ASAP 2000, cellulose, diatomaceous earth, cotton, synthetic and natural carpet fibers, cotton, and synthetic filter materials. The N-halamine polymer generally comprises a weight percent of about 0.1 to about 10% of the treatment composition, for applications involving contact between the treatment composition and human or animal bodily fluids such as in disposable diapers, incontinence pads, bandages, sanitary napkins, pantiliners, sponges, and animal litter.

The present invention will be further understood by reference to the following non-limiting examples.

EXAMPLES

Example 1

Synthesis and Characterization of Brominated, Uracil or Uracil Derivative-Conjugated Polystyrene (Ps) Beads Materials and Methods Conjugation with Uracil or its Derivatives onto Ps FIG. 1 shows the two-step conjugation of uracil (UR; formula 15) to chloromethylated polystyrene beads (CMPS, or PS-Cl), forming UR-Ps. Uracil derivatives, such as 6-amino uracil (formula 16), orotic acid (formula 17), and uric acid (formula 18), could also follow the same reaction scheme as shown in FIG. 1.

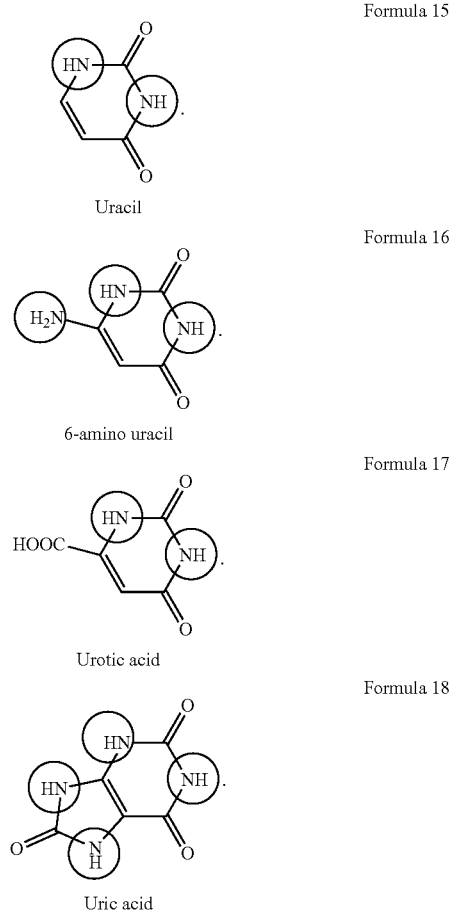

Formula 15
Uracil

Formula 16
6-amino uracil

Formula 17
Urotic acid

Formula 18
Uric acid

The circles indicate the active nitrogen site for conjugation with beads or the active nitrogen site for bromination.

First, uracil salt was prepared in an acid-base reaction between uracil (or its derivatives) and bases (e.g., potassium hydroxide, sodium hydroxide), followed by type SN2 nucleophilic substitution. The potassium salts of uracil or of uracil derivatives were prepared by reacting an equivalent molar ratio of potassium hydroxide to uracil (or its derivative) in a minimum amount of ethanol with stirring under reflux for 2 hours. Ethanol was subsequently removed under high vacuum to obtain the salt form of uracil (or its derivatives).

Second, Cl— was a leaving group from PS-Cl in the reaction with the salt form of uracil (or its derivatives). Prior to conjugation, PS-Cl beads were cleaned to remove organic impurities by soaking them in acetone (10 ml/g) for 2 hours at 25° C., then filtered and washed three times with acetone (5 ml/g), and dried at 50° C. by evaporator.

400 ml dimethyl formamide (DMF, anhydrous), or dimethylsulfuxide (DMSO, anhydrous), was added to the salt form of uracil (or its derivatives), and the mixture was heated to 100° C., or 120° C., respectively, until all of the salt dissolved. The salt dissolved faster in DMSO than in DMF. Then, the system was connected to nitrogen balloon, and 50.0g of cleaned PS-Cl beads were added at ratio 1:1.5 of the leaving group of PS-Cl to uracil salt. The system was mechanically stirred with a stirring rod at 300 rpm, and the mixture was heated for 13 h, or 2h, respectively. Resultant conjugated beads (e.g., UR-Ps) were separated by filtration and washed 5 times with boiling 200 ml double-distilled water (DDW) to remove unreacted uracil salt and then with acetone. Beads were evaporated till dryness at 70° C.

Bromination of UR-Ps

Figure 2A:
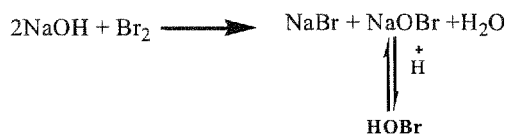
FIG. 2A is a schematic representation of the synthesis of hypobromous acid from bromine.
Figure 2B:
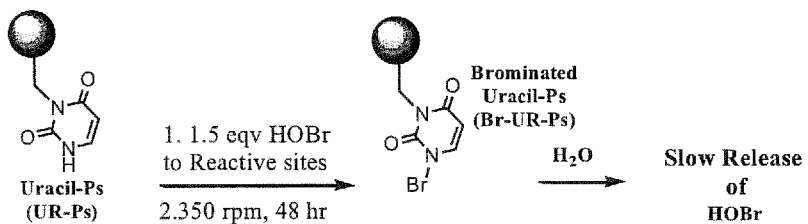
FIG. 2B is a schematic representation of the bromination reaction of uracil-conjugated polystyrene beads with hypobromous acid.
Figure 3A:
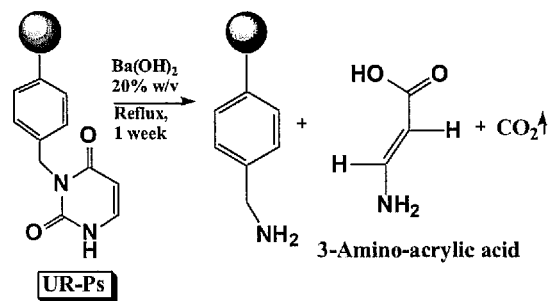
FIG. 3A is a schematic representation of the hydrolysis of uracil-conjugated polystyrene beads (UR-Ps) in barium hydroxide (Ba(OH)$_2$), releasing 3-amino-acrylic acid.
Figure 3B:
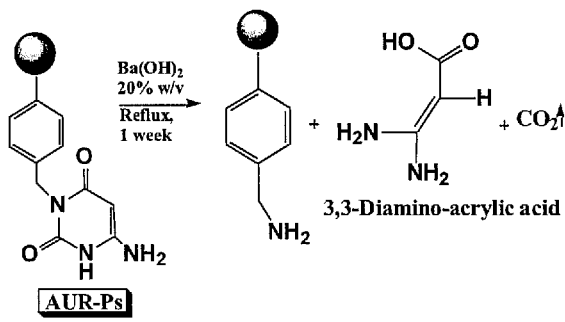
FIG. 3B is a schematic representation of the hydrolysis of 6-aminouracil-conjugated polystyrene beads (AUR-Ps) in Ba(OH)$_2$, releasing 3,3-diamino-acrylic acid.
Figure 3C:
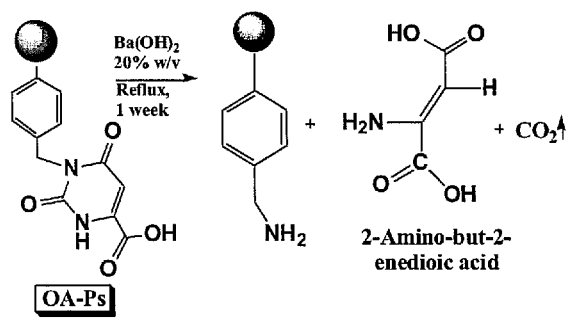
FIG. 3C is a schematic representation of the hydrolysis of orotic acid-conjugated polystyrene beads (OA-Ps) in Ba(OH)$_2$, releasing 2-amino-but-2-enedioic acid.
Figure 3D:
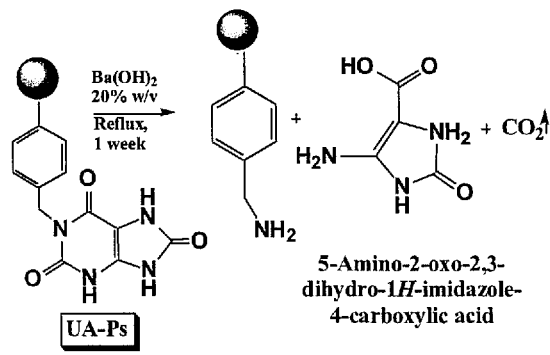
FIG. 3D is a schematic representation of the hydrolysis of uric acid-conjugated polystyrene beads (UA-Ps) in Ba(OH)$_2$, releasing 5-amino-2-oxo-2,3-dihydro-1H-imidazole-4-carboxylic acid.

FIG. 2A shows the reaction to generate hypobromide (HOBr), in situ, for an active bromination of UR-Ps (or polystyrene beads conjugated with uracil derivatives) as shown in FIG. 2B. Specifically, HOBr was prepared in situ from bromine in an amount that would fit a molar ratio of 1.5:1 for HOBr to the available sites for bromination on the UR-Ps (or polystyrene beads conjugated with uracil derivatives). The bromination of 20 g UR-Ps, equal to 5.82 mmol theoretical reactive sites/g of conjugated beads based on the assumption of 1 reactive site/molecule, was as follows: to a 500 ml, three-neck round bottom flask equipped with magnetic stir and ice-bath, 27.94 g of NaOH was carefully added to 222 ml DDW to form 3.15N solution. After cooling, when the temperature of the reaction solution reached 20° C., bromine (8.94 ml) was carefully added drop wise to form a dark-yellowish colored solution. The reaction mixture was stirred at 350 rpm for 30 min, followed by drop-wise addition of 4N acetic acid solution over 30 min to reach pH 6.5 (almost 130 ml was needed), resulting in a dark-red solution. Stirring was continued for 48 h, followed by isolation of beads by filtration and washing with deionized water to remove unbound bromine. The beads were dried using evaporator at 50° C. Similar procedures were applied for the uracil derivative-conjugated beads.

Elemental Analysis

Elemental microanalysis of nitrogen (% N), carbon (% C), and hydrogen (% H) was performed using the Perkin-Elmer 2400 series II Analyzer. Chlorine and bromine (% Cl, % Br) were determined by using oxygen-flask combustion method (Schoniger application) and subsequent potentiometric titration by the 835 Titrando Metrohm Titroprocessor and by Ion chromatography analysis using a Dionex IC system. All the bead samples, including the starting materials chloromethyl polystyrene, the intermediate product, uracil conjugated polystyrene, and the final brominated product, were fully analyzed for C, N, H, Cl and Br content, Total Internal Reflection (iTR) Measurement Bead samples were analysed using Smart iTR instrument, Nicolet iS10 (Thermo Scientific company, USA). Beads were placed directly on the diamond Nicolet, and scanned in interval 500-4000 cm$^{-1}$. The spectra were evaluated with OMNIC software to calculate spectra similarities (%).

Scanning Electron Microscopy

Beads size, morphology, tunnel diameter and porosity of the PS-Cl beads before and after conjugation reaction were analyzed using SEM visualization, Beads were first frozen with liquid nitrogen and then cut with a sharp scalpel to visualize the inner and outer surface. Samples were sputter-coated with platinum/palladium (Pt/Pd) to a thickness of about 10 nm using a sputtering deposition machine (Polarone E5100), and visualized by scanning electron microscopy (SEM), FEI E-SEM Quanta 2000 at constant acceleration voltage of 5 KV. Average intervals were measured using the SEM-internal dedicated software.

Ninhydrin Assay to Quantify Conjugated UR or its Derivatives

Beads (1 gram) conjugated with uracil or its derivatives were transferred into 10 ml of aqueous barium hydroxide solution (20% w/v) and refluxed for 1 week to hydrolyze uracil molecules or uracil derivatives, from which different amino acrylic acids were released, leaving the polymeric resin with primary amine groups.

FIGS. 3A-3D show the hydrolysis of UR-Ps, 6-aminouracil conjugated Ps, orotic acid conjugated Ps, and uric acid conjugated Ps, respectively. Following hydrolysis, the particles were filtered out, sodium sulfate was added to the solution, and barium was precipitated and separated from the amino acrylic acid solution by centrifugation for 20 min at 4000 rpm. The separated aqueous solution was lyophilized to obtain the released amino acrylic acid. The residue was dissolved in 5 ml and the concentration of amino acid (amino acrylic acid) was determined using the ninhydrin assay as follows: 100 µl of the solution or 100 mg of the amino beads were transferred to a glass tube and the volume was brought to 4 ml with DDW; then 1 ml of ninhydrin solution (5 g/100 ethanol) was added and mixed for 10 seconds and incubated in a boiling water bath for 15 min; 1 ml of ethanol:DDW at 50:50 was added and mixed for another 10 sec, and samples were immediately analyzed using spectrophotometer at 570 nm. Alanine of different known concentrations between 2 and 40 µg/ml were assayed with ninhydrin as standards to prepare a calibration curve. Results of conjugation were presented in mmol/g conjugated beads.

Iodometric Titration to Quantify Bromine %

The loaded bromine % in the polymeric samples was determined by the iodometric/thiosulfate titration method. Sodium thiosulfate solution (0.1 N, calibrated with potassium iodate) was used to titrate suspension of ~50 mg beads in: 50 ml of DDW with 1 g potassium iodide, 12.5 ml acetic acid (2M), and 2 ml of 1% starch solution. End point of the titration was the solution color change from blue to colorless. Similar to the Cl+ % calculation (Liang et al., *Ind. Eng. Chem. Res.*, 46:6425-6429 (2007)), the Br+ % was calculated with the following equation:

$$Br + \% \text{ (Weight)} = \left[\frac{N * V * 79.90}{2 * W}\right] * 100\%$$

where Br$^+$ (%) was the weight percentage of oxidative bromine in the beads samples; N was the normality of the titrant sodium thiosulfate; V was the volume of the titrant sodium thiosulfate in milliliters; and W was the weight of tested beads samples in milligrams.

Results

Conjugation with Uracil or its Derivatives on Ps

Conjugation reaction between uracil (or its derivatives of formulae 2-4) to chloromethyl polystyrene resin (Cl-Ps) was conducted as described in FIG. 1. Uracil molecules were first reacted with potassium hydroxide or sodium hydroxide in ethanolic solution to produce uracil salt (—CO—NH—CO—), followed by solvent evaporation and conjugation reaction uracil salt-chlorometyl polystyrene resin. For best comparison among conjugated derivatives, the same batch of chloromethyl polystyrene beads was used in conjugation, where the beads had the following characteristics: 300-600 µm beads size, 1% crosslinking, and low porosity density of 30 nm porous size. Scanning electron microscopy confirmed no significant change in particle sizes or porosity was found comparing before and after conjugation with uracil or its derivatives. Conjugation reaction was studied in two polar solvents, N,N-dimethylformamide (DMF) and dimethyl sulfoxide (DMSO). In DMF, 8-28% weight increase was found due to conjugation with uracil derivatives, while in DMSO conjugation resulted in almost 30% weight increase.

Fourier transform infrared spectroscopy (FTIR) spectra confirmed the conjugation of uracil or its derivatives to polystyrene. The peak at 1264 cm$^{-1}$ attributed to -CH$_2$—Cl vibration in the starting material disappeared after conjugation with uracil or its derivatives. New carbonyl peaks were identified at 1630-1780 cm$^{-1}$ for polystyrene conjugated with uracil (UR-Ps), with 6-aminouracil (AUR-Ps), with orotic acid (OA-Ps), or with uric acid (UA-Ps). No difference in the FTIR spectra was found for beads conjugated in DMSO compared to DMF mediated conjugation. For chloromethyl polystyrene, the peaks were as follows: =C—H Sir (3030-3080 cm$^{-1}$), —CH$_2$—Cl (2921,2849 cm$^{-1}$), C=C vib (1610,1510,1444 cm$^{-1}$), C—Cl vib (1264,825 cm$^{-1}$). For conjugated samples, the peaks were as follows: N—H (3) Str 3336 cm$^{-1}$, N—H (1) Str 3070-3100 cm$^{-1}$, Str (3030-3080 cm$^{-1}$), CH$_3$(C—H) Str 2976 cm$^{-1}$, C=C Vib (1513,1445,1415 cm$^{-1}$), C—O Str(1770-1782,1651-1726 cm$^{-1}$).

Table 1 shows the elemental analysis of chloromethyl polystyrene before and after conjugation with uracil or its derivatives. Elemental analysis indicated a nitrogen content of 1.37-6.81% for uracil conjugated polystyrene (UR-Ps). Conjugation in DMF resulted in a greater increase in the nitrogen content % than conjugation in DMSO. A lower conjugation yield was observed for orotic and uric acid, as determined by N % of 1.92 and 1.37, respectively.

TABLE 1

Elemental analysis of polystyrene and uracil (or its derivative) conjugated polystyrene, before and after Uracil Hydrolysis

| Description[a] | Uracil Hydrolysis[b] | C % | H % | N % | Cl % |
|---|---|---|---|---|---|
| Cl-Ps | — | 73.88 | 6.34 | — | 20.65 |
| UR-Ps (DMF) | Before | 74.20 | 6.05 | 6.81 | 0.55 |
| UR-Ps (DMF) | After | 68.20 | 5.72 | 5.83 | — |
| AUR-Ps (DMF) | Before | 73.72 | 6.28 | 6.09 | 0.59 |
| AUR-Ps (DMF) | After | 71.29 | 6.31 | 3.89 | — |
| AUR-Ps (DMSO) | Before | 72.10 | 6.48 | 5.37 | 4.06 |
| AUR-Ps (DMSO) | After | 69.45 | 5.77 | 2.82 | — |
| OA-Ps (DMF) | Before | 73.44 | 6.57 | 1.92 | 4.11 |
| ON-Ps (DMF) | After | 76.68 | 6.75 | 1.40 | — |
| UA-Ps (DMF) | Before | 75.10 | 6.32 | 1.37 | 9.20 |
| UA-Ps (DMF) | After | 74.38 | 6.21 | 1.18 | — |

[a]Abbreviation of conjugated polystyrene: (UR)—Uracil, (AUR)—6-Aminouracil, (OA)—Orotic acid and (UA) Uric acid. DMF/DMSO, solvent used in conjugation reaction.
[b]Hydrolyzed in aqueous barium hydroxide (20% w/v), reflux 1 week.

A quantitative method for determination of conjugation of uracil molecules (six member ring) to polymeric resin (mmol/g) was developed, based on similar properties seen with hydantoins (five-member ring compounds) which underwent profound breakdown when heated with a large excess of barium hydroxide in an aqueous solution for relatively long periods of time and resulted in α-amino acids (Ware E, *Chem. Rev.,* 46(3):403-470 (1950)). FIGS. 3A-3D show polystyrene beads conjugated with uracil or its derivatives hydrolyzed in aqueous barium hydroxide solutions and released amino acrylic acid, resulting in primary amine functionalized resin as confirmed by FTIR and shown in Table 2. All the conjugated molecules were found to have hydrolyzed.

TABLE 2

FTIR spectra comparison and similarity % calculation of samples before and after hydrolysis of the conjugated polystyrene with uracil or its derivatives.

| Conjugated Beads[a] | Beads After Hydrolysis[b] | Carbonyl Peaks[c] | Spectra Similarity %[d] |
|---|---|---|---|
| UR-Ps | UR/NH$_2$-Ps | Decreased Intensity* | 91.63 |
| AUR-Ps | AUR/NH$_2$-Ps | Completely disappeared | 59.56 |
| OA-Ps | OA/NH$_2$-Ps | Completely disappeared | 77.08 |
| UA-Ps | UA/NH$_2$-Ps | Completely disappeared | 61.83 |

[a]Abbreviation of conjugated polystyrene: (UR)—Uracil, (AUR)—6-Aminouracil, (OA)—Orotic acid and (UA) Uric acid.
[b]Hydrolyzed in aqueous barium hydroxide (20% w/v) at reflux for 1 week.
[c]Carbonyl peaks indicated the presence of conjugated uracil derivatives monitored by Smart iTR instrument, Nicolet iS10.
[d]Spectra similarity % was conducted using OMNIC software by overlaying FTIR spectrums before and after hydrolysis.
*Carbonyl peaks intensity decreased significantly, indicating incomplete hydrolysis/or partially hydrolyzed molecules still attached.

Quantifications of the released amino acrylic acid and the resultant polystyrene with primary amines were conducted using the ninhydrin assay based on color development. The reaction between α-amino acid/amino acrylic acid and ninhydrin was monitored by spectrophotometer at 570 nm. Linear regression of a calibration curve prepared with alanine at a concentration ranging between 2 and 40 μg/ml was calculated: y=5370.4x−0.1858, $R^2$=0.9832, where y was the absorbance at 570 nm and x was concentration of amino acid in mmol/ml. Table 3 shows the conjugation loading for polystyrene with different conjugations compared to conjugation values calculated from elemental analysis. Analysis measuring the resultant polymeric resin with primary amines was found to be less accurate and of lower values than the analysis measuring the free released amino acid/amino acrylic acid.

TABLE 3

Comparison of measurements of uracil (or derivative)-polystyrene conjugation based on different methods or assays.

| Conjugation[a] | Assay Method I (mmol/g)[b] | Assay Method II (mmol/g)[c] | Assay Method III (mmol/g)[d] |
|---|---|---|---|
| UR-Ps (DMF) | 3.24 | 2.67 | 2.53 |
| AUR-Ps (DMF) | 2.05 | 2.03 | 1.93 |
| AUR-Ps (DMSO) | 1.81 | 1.75 | 1.97 |
| OA-Ps (DMF) | 1.17 | 1.13 | 1.07 |
| UA-Ps (DMF) | 0.41 | 0.43 | 0.38 |

[a]Abbreviation of conjugated polystyrene - See table 1 or table 2.
[b]Method I: Calculated conjugation based on elemental analysis as reported in Table 1.
[c]Method II: Calculated conjugation based on ninhydrin assay quantifying the released amino acrylic acid.
[d]Method III: Calculated conjugation based on ninhydrin assay quantifying the post-hydrolysis, primary amine groups on the polystyrene beads.

Bromination of Uracil (or its Derivative)-Conjugated Ps

After bromination, a 19-26% weight increase was observed for uracil derivatives. Due to amide bromination, nearby carbonyl groups were partially affected and slightly decreased their vibrational values. Changes in the vibration of carbonyl groups of the rings of conjugated uracil or its derivatives were analyzed by FTIR analysis. These changes in carbonyl group and spectra similarity % before and after bromination are summarized in Table 4, confirming bromination occurred.

TABLE 4

Changes in the vibration of carbonyl peaks due to bromination on uracil (or its derivative)-conjugated polystyrene.

| Conjugated Beads[a] | Carbonyl Peaks Before Bromination (cm$^{-1}$) | Brominated Beads[a] | Carbonyl Peaks After Bromination (cm$^{-1}$) | Spectra Similarity %[b] |
|---|---|---|---|---|
| UR-Ps | 1651.99 | Br-UR-Ps | 1682.70, 1604.50 | 65.06 |
| AUR-Ps | 1698.99, 1622.09 | Br-AUR-Ps | 1697.47, 1602.91 | 49.59 |
| OA-Ps | 1698.13, 1651.53, 1604.50 | Br-OA-Ps | 1694.31, 1603.28 | 78.76 |

TABLE 4-continued

Changes in the vibration of carbonyl peaks due to bromination on uracil (or its derivative)-conjugated polystyrene.

| Conjugated Beads[a] | Carbonyl Peaks Before Bromination (cm$^{-1}$) | Brominated Beads[a] | Carbonyl Peaks After Bromination (cm$^{-1}$) | Spectra Similarity %[b] |
|---|---|---|---|---|
| UA-Ps | 1782.02, 1726.57, 1698.72 | Br-UA-Ps | 1779.16, 1724.57, 1698.16 | 80.72 |

[a]Abbreviation of conjugated/brominated-conjugated polystyrene: (UR)—Uracil, (AUR)—6-Aminouracil, (OA)—Orotic acid and (UA) Uric acid.
[b]Spectra similarity % was conducted using OMNIC software by overlaying FTIR spectra before and after bromination.

Example 2

Release of Hypobromous Acid and Reloading/Re-Bromination Cycles on Brominated, Uracil-Conjugated Polystyrene Materials and Methods Hypobromous Acid Release The brominated uracil-conjugated Ps beads released hypobromous acid (HOBr) via contact with water. The concentration of released HOBr in water was measured using AQUALYTIC® diethyl-p-phenylene diamine (DPD1) tablet reagents in an AL250 photometer at 528 nm.

16 g of dry Br-UR-Ps beads or other beads brominated via conjugation with uracil derivatives were packed into columns (28 mm wide). Each column was washed with 25 liters of water per day in a rate of 10±1 min/L. Hypobromous acid concentration was measured every 10-15 liters until the released amount was reduced to 0.01 ppm. Hypobromous acid partially dissociated in water to hypobromite. Brominated beads were released to: Br-UR-Ps (DMF) and Br-AUR-Ps (DMSO) 110 liters, Br-AUR-Ps (DMF) and Br-OA-Ps (DMF) and Br-UA-Ps (DMF) 150 liters.

Reloading/Re-Bromination Cycles

Beads were examined for reloading (re-bromination) capability after release of bromine as HOBr. Remaining bromine was completely extracted by incubating the beads for one week in 5% $Na_2S_2O_3$ aqueous solution, followed by filtration and washing several times with DDW, Beads were re-brominated in a method described in Example 1 "bromination of UR-Ps". The re-bromination and bromine extraction procedures were conducted for at least 3 cycles. Samples were analyzed for the bromine content % via elemental analysis.

Results

Figure 4:
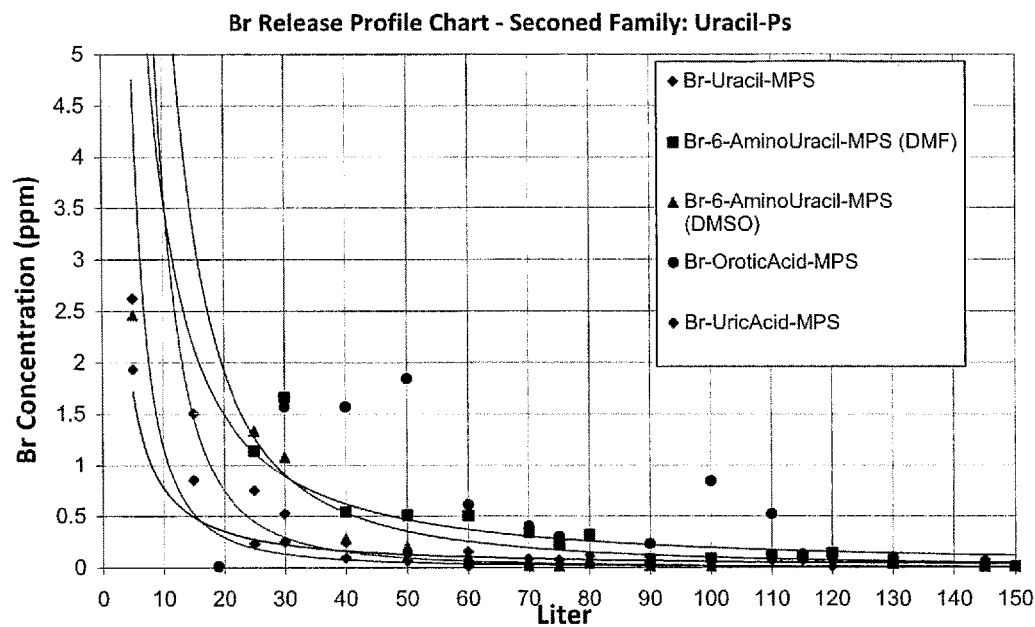
FIG. 4 is a line graph showing the concentrations of released hypobromous acid (ppm) from columns packed with polystyrene beads that are conjugated with brominated uracil or different brominated uracil derivatives, over the volume of water (liters) washing the columns.

FIG. 4 shows brominated, 6-aminouracil-, orotic acid-, and uric acid-conjugated polystyrene beads exhibited an extended release profile over 150 liters than brominated uracil polystyrene (Br-UR-Ps). This could be explained by the presence of carboxylic/amine, electron withdrawing/donating groups, respectively, which affects the carbon near the double bond of the uracil ring. Br-OA-Ps released 8.1% of its bromine content, while Br-AUR-Ps released 6.0%, Br-UA-Ps released 3.3%, and Br-UR-Ps released 2.7%, as shown in Table 5, Generally, remaining bromine % after the release study was high with a possible capability for extra extended release for another hundreds of liters. After the release study, beads were extracted from remaining bromine and examined for reloading ability and capacity for three cycles of re-bromination and extraction. Bromine loading % was found to be close to the levels in the samples before the release study.

TABLE 5

Elemental analysis of brominated uracil conjugated polystyrene, before and after release study and loading/reloading study.

| Description[a] | Bromine Release | C % | H % | N % | Br % |
|---|---|---|---|---|---|
| Br-UR-Ps (DMF)[b] | Before | 56.39 | 4.37 | 4.70 | 21.49 |
| Br % (weight)[c] | Before | | | | 19.98 |
| Br-UR-Ps (DMF)[b] | After 110 liters | 59.99 | 4.44 | 5.00 | 18.82 |
| Reloading After 3 Cycles[b,d] | | | | | 21.72 |
| Br-AUR-Ps (DMF)[b] | Before | 53.37 | 4.55 | 3.62 | 25.27 |
| Br % (weight)[c] | Before | | | | 23.47 |
| Br-AUR-Ps (DMF)[b] | After 150 liters | 61.79 | 4.70 | 3.44 | 19.25 |
| Reloading After 3 Cycles[b,d] | | | | | 25.43 |
| Br-AUR-Ps (DMSO)[b] | Before | 53.68 | 4.20 | 2.46 | 25.36 |
| Br % (weight)[c] | Before | | | | 23.03 |
| Br-AUR-Ps (DMSO)[b] | After 110 liters | 59.82 | 4.30 | 2.41 | 20.60 |
| Reloading After 3 Cycles[b,d] | | | | | 25.67 |
| Br-OA-Ps (DMF)[b] | Before | 54.90 | 4.55 | 1.61 | 24.90 |
| Br % (weight)[c] | Before | | | | 22.28 |
| Br-OA-Ps (DMF)[b] | After 150 liters | 65.24 | 5.12 | 1.66 | 16.80 |
| Reloading After 3 Cycles[b,d] | | | | | 25.12 |
| Br-UA-Ps (DMF)[b] | Before | 59.43 | 5.17 | 1.07 | 16.64 |
| Br % (weight)[c] | Before | | | | 15.12 |
| Br-UA-Ps (DMF)[b] | After 150 liters | 66.50 | 5.11 | 0.89 | 13.89 |
| Reloading After 3 Cycles[b,d] | | | | | 16.88 |

[a]Abbreviation of brominated-conjugated polystyrene: see table 1.
[b]Bromine content % determined by elemental analysis.
[c]Found bromine % using iodometric/thiosulfate titration method and equation described in Example 1.
[d]Bromine content % after 3 cycles of bromine extraction and reloading for brominated beads used for release study.

Example 3

Antimicrobial Activity of Brominated, Uracil-Conjugated Polymeric Beads

Materials and Methods

Bacterial Strains and Growth Conditions

E. coli (ATCC 8739) was provided by Hy Laboratories, Ltd., Rehovot, Israel. Bacteria for the test were prepared by growing overnight to obtain a stationary growth phase. Fresh stocks of the test bacteria were prepared the night prior to the challenge assay. A tryptic soy agar-TSA (Difco) plate was inoculated and incubated overnight at 35° C. Then, E. coli colonies were re-suspended in a phosphate saline buffer (PBS) and thoroughly vortexed. The obtained suspension was additionally diluted in PBS to an initial concentration of $10^8$ CFU/mL, which was used as the bacterial stock for a challenge test.

Bacteriophage, type Coliphage MS2 (ATCC 15597-B1), was obtained from ATCC, grown, and assayed in the bacterial host, E. coli (ATCC 15597) at 37° C. utilizing tryptic soy broth-TSB (Difco). A high virus mixture was centrifuged at 6000 rpm for 15 min, and the supernatant containing Coliphage was removed and filtered through a 0.22 μm cellulose filter and diluted in PBS to $10^7$ PFU/mL. The MS2 stock was refrigerated at 4° C. until use in the experiment. A pure culture of the host bacteria E. coli, obtained from the ATCC collection, was rehydrated, cultured, and stored according to the enclosed instruction. Fresh (4 h) stock of E. coli (ATCC 15597) host bacteria was prepared in TSB each time prior to the challenge test and served as the inoculums for E. coli lawn on the top layer of agar used in the phage assay.

For challenge test preparation, the resultant pellets of purified MS2 and E. coli (ATCC 8739) stocks were added to an appropriate volume of the test water to achieve an influent final concentration of $10^7$ colony formation units (CFU)/100 nit and $10^4$ plague formation units (PFU)/L ($10^4$ PFU/mL), respectively. Challenge water was thoroughly mixed, so that the organisms would maintain uniform suspension during the challenge.

Antimicrobial Assay

The ability of tested materials to inactivate the E. coli bacteria and MS2 bacteriophages in contaminated water was tested. Antimicrobial evaluation was conducted in columns according to NSF-231 protocol for testing microbiological water purifiers with minimal modifications. The microbiological quality of the water from the tested materials was monitored for 20 days. Tested beads, including starting materials and uracil conjugated beads before and after bromination, were placed inside identical columns, The system was 100% operated and flushed with water at 25 liters per day. Antimicrobial efficacy of the tested materials was measured at different challenge points, where for each challenge point 2.5 liters of contaminated water (i.e., challenge water) containing $10^7$ CFU/100 mL of E. coli bacteria or $10^4$ PFU/mL of MS2 bacteriophages were passed through the column. First, 250 mL of water was allowed to pass through the system prior to sampling to assure that sufficient spike had been added to the system. Next, two liters of eluted challenge water were collected where a portion was transferred into a sterile bottle containing sodium thiosulfate (0.01% final concentration) to neutralize any residual bromine. In addition, residual bromine in effluent was measured at each microbiological sampling point.

Bromine inactivation experiment was carried out in general (type 1) water, whose chemical and physical characteristic parameters were presented in Table 6.

The specific characteristic parameters were obtained by mixing reverse osmosis treated water (RO) and tap water (flushing water) or by adjusting RO water (challenge water) as described in Guide Standard and Protocol for Testing Microbiological Water Purifiers (NSF International—NSF Protocol P231 Microbiological Water Purifiers, February, 2003; Guide Standard and Protocol for Testing Microbiological Water Purifiers. USEPA, Registration Division, Office of Pesticide Program, Criteria and Standards Division, Office of Drinking Water. April, 1987).

Microbial Assay Techniques: the collected samples were tested for microbial analysis immediately. Aliquots of the sample (100 ml for E. coli bacteria and 1 ml for MS2 phages) were portioned for analysis. All samples were processed in duplicate. Influent samples were assayed with multiple dilutions. E. coli was counted in all samples by the membrane filter method using m-FC agar, following the method described in Standard Methods for the Examination of Water and Wastewater, Online, American Public Health Association, Washington, D.C., $18^{th}$ ed, 1992, Section 9222. MS2 was assayed by the double layer over-lay method of Adams (Adams, M. H. Wiley Interscience, New York, 1959, 592). The detection limit for E. coli bacteria was 1 CFU/100 ml, and for MS2 bacteriophages was 1 PFU/1 ml.

Results

Figure 5:
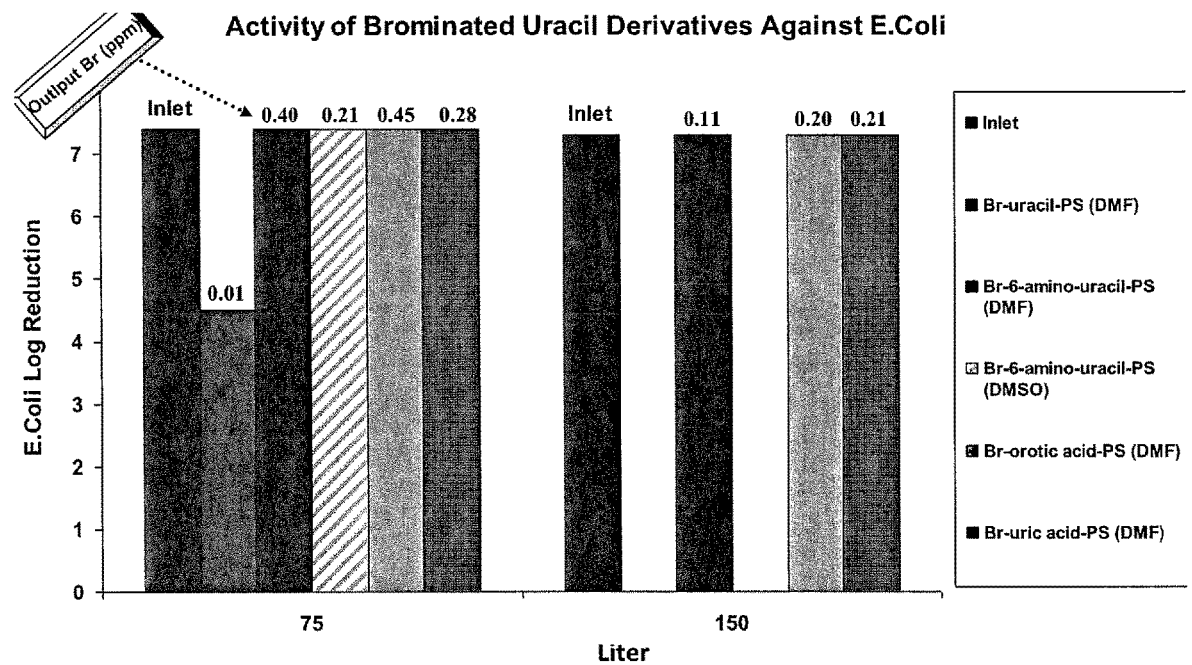
FIG. 5 is a bar graph showing the log-scale reduction of E. coli bacteria (log [CH:1/100 ml]) at different points (inlet, 0 liter; 75 liters; or 150 liters) where contaminated water is challenged to elute through the columns packed with polystyrene beads that are conjugated with brominated uracil or various brominated uracil derivatives. The concentrations (ppm) of residual bromine in effluent are labeled above each bar.

Average log reduction of E.coli bacteria was calculated at each challenge point. FIG. 5 shows the average log reduction of E. coli and the concentration of residual bromine in effluent at each challenge point. All tested materials exhibited good antimicrobial properties, especially Br-AUR-Ps (DMF), Br-OA-Ps (DMF) and Br-UA-PS (DMF) maintained 7 log reduction of E.coli for all tested points during 150 L.

Figure 6:
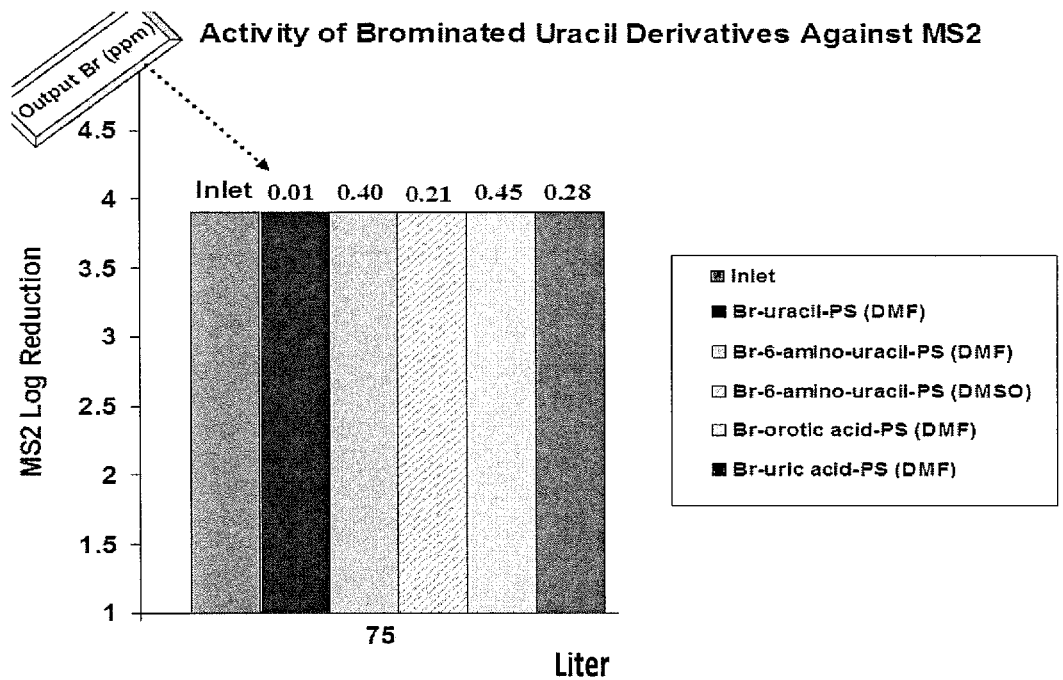
FIG. 6 is a bar graph showing the log-scale reduction of MS2 bacteriophage (log [PFU/ml]) in contaminated water when the water is challenged at inlet and at 75 liters to elute through columns packed with polystyrene beads that are conjugated with brominated uracil or various brominated uracil derivatives. The concentrations (ppm) of residual bromine in effluent are labeled above each bar.

FIG. 6 shows the average log reduction of bacteriophages MS2 in the first 75 L and the concentration of residual bromine in effluent. All the materials exhibited a good activity of 4 log reduction against MS2.

These results spotlighted the antimicrobial potential of halogenated cyclic molecules containing urea groups.

Example 4

Brominated, Hydantoin (or its Derivative)-Conjugated Ps Beads

Two potential derivatives conjugated polystyrene belonged to hydantoin family: (1) allantoin, and (2) 5,5'-diphenylhydantoin.

TABLE 6

Chemical/Physical parameters of flushing water and challenge water.

| | | | | Acceptance Criteria. | | | |
|---|---|---|---|---|---|---|---|
| Test Water | Water Basis | Temperature (° C.) | pH | Chlorine (ppm) | Turbidity (NTU) | TDS (ppm) | TOC (ppm) |
| Flushing | RO + Tap Water (2:1) | 20 ± 5° C. | 6.5-8.5 | Free (<0.1) | 0.1-5 | 50-500 | 0.1-5 |
| Challenge | RO | 20 ± 5° C. | 6.5-8.5 | Free (<0.05) | 0.1-5 | 50-500 | 0.1-5 |

| Polymer | Chemical Structure | Elemental Analysis | Description | Applications | Br+ Output, Microb Log Reduction |
|---|---|---|---|---|---|
| 5,5'-DiphenylHydantoin Conjugated Polystyrene Br-DPH-Ps (DMF) | 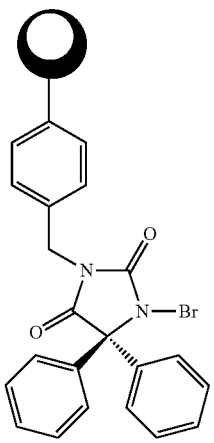  Formula 5 | % C 60.46, % H 4.50, % N 5.40, % Br 19.28 | Conjugated in DMF 1% Crosslinked Beads | Potable Water Released in Columns (Per 16 g) Flow 10 min/L | 300 Liters- 0.33 ppm >7.5 *E. Coli* 75 Liters(*)- 1.73 ppm >3.9 MS2 |
| Allantoin Conjugated Polystyrene Br-All-Ps (DMF) | 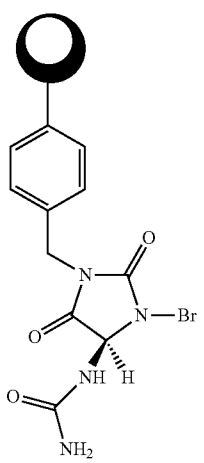  Formula 6 | % C 58.41, % H 4.99, % N 4.89, % Br 21.51 | Conjugated in DMF 1% Crosslinked Beads | Potable Water Released in Columns (Per 16 g) Flow 10 min/L | 180 Liters- 0.01 ppm 6.2 *E. Coli* 75 Liters(*)- 0.22 ppm >3.9 MS2 |

(*) the activity against MS2 bacteriophage was monitored till 75 liters.

Example 5

Bromination without Conjugation to Polymer

Materials and Methods

Bromination of uracil and hydantoin molecules in their free forms without conjugation to polymeric surface was tested. These brominated molecules could be encapsulated in polymeric resin or other water purifying carriers and used for controlled release of N-bromo or chloro hydantoin. Bromination was achieved similarly to the procedures described in Example 1, while quantities and volumes were adjusted according to the number of active sites for bromination. After bromination completion, brominated molecules were separated from the bromination section and analyzed for bromine contents in spectral analysis.

Results

Spectral analysis showed active N—Br bond formation, as well as mono-brominated and di-brominated molecules. The brominated molecules were tested for release of oxidative HOBr in an aqueous medium and the antimicrobial activity. All of the tested brominated molecules exhibited strong antimicrobial efficiency against a wide spectrum of microorganisms.

Example 6

Polyurethane Sponges Releasing Oxidative Halogens

Materials and Methods

Synthesis

Polyurethane (formula 19) from different sources (with different densities, chemical structure and porosities) were brominated to form brominated polyurethane shown in formula 10, using the same procedure described in Example 1 for bromination of uracil derivatives following the reaction ratio of reactive sites per polymeric unit to conjugated molecule. Reagents and volumes were adjusted accordingly.

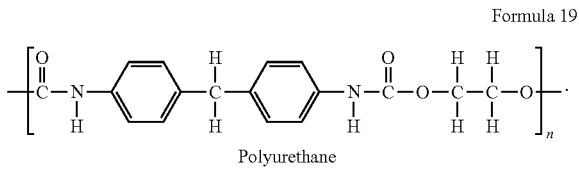

Formula 19
Polyurethane

Release Studies

For brominated polyurethane, released hypobromous acid (HOBr) was traced by suspending 1 g of brominated sponges in liter for 1 hour. Water was changed hourly for 24 h. The concentration of HOBr in water was measured using DPD1 tablets (diethyl-p-phenylene diamine), AQUA-LYTIC®, in an AL250 photometer at 528 nm.

The release was studied at 25° C. for several weeks. To a 20 ml glass vail, a 15 ml of double distilled water (DDW) with adjusted pH (1, 3, 5, 7 and 10) was added to 0.5 g of the brominated PU polymer with stir bar and 200 rpm. Samples at different time points were retrieved and polymers were separated from solution. While the pH of the solution and HOBr concentration was determined using DPD-1 kit, the polymers were analyzed by elemental analysis and FUR.

Results

Prepared materials were traced for released oxidative bromine (Br+) for hundreds of liters. Table 7 shows the result from elemental analysis, indicating a high bromine loading efficiency. The brominated materials exhibited continuous hypobromous acid release for the study period of 24 hours, releasing active Br+>0.1 ppm.

TABLE 7

Elemental analysis of three types of polyurethane (with different densities, chemical structure and porosities) before and after bromination.

| P.U type | C % | H % | N % | Br % |
|---|---|---|---|---|
| Type I - Before bromination | 52.96 | 7.24 | 5.19 | 0 |
| Type I - After bromination | 41.02 | 5.20 | 3.60 | 24.41 |
| Type II - Before bromination | 53.81 | 7.29 | 5.31 | 0 |
| Type II - After bromination | 32.36 | 5.59 | 2.77 | 21.95 |
| Type III - Before bromination | 61.32 | 8.10 | 6.53 | 0 |
| Type III - After bromination | 50.02 | 6.27 | 4.90 | 19.42 |

*C, H, N, and Br content of brominated PU (% C, % H, % N ± 0.3%, % Br ± 0.5%).

Bromination occurred in high capacity and could reach 24% w/w bromine content in the polymer beads. Partial bromination was also possible by adding less HOBr per polymer unit.

To confirm the bromination of nitrogen atoms in the repeating amide group of polyurethane, a linear non-crosslinked polyurethane was synthesized and brominated. Its $^1$H-NMR spectra was compared to the non-brominated version. Non-brominated polyurethane had a single peak centered at 9.50 ppm assigned to —NHCOO—. The appearance of multiple peaks at 7.04-7.34 ppm was attributable to the aromatic protons; peak at 2.47-2,50 ppm for DMSO; while peaks at 1.46-1.67 were attributable to aliphatic part. With brominated polyurethane, the single peak was shifted to 8.88 ppm, indicative of the unreacted —NHCOO— group, and peaks at 7.06-7.52 ppm were attributable to the aromatic protons, also found to be affected/shifted due to the bromination.

FTIR analysis confirmed the bromination for different PU:

For type I PU, N-H vibration appeared at 3294.39 cm$^{-1}$ and 3258.66 cm$^{-1}$ for the polymer before and after bromination, respectively. CH$_2$— vibration appeared at 2869.42 cm$^{-1}$ and 2869.92 cm$^{-1}$, before and after the bromination, respectively. 1601.00-1724.34 cm$^{-1}$ vibration for C=O of the initial PU before bromination shifted to 1646.97-1708.88 cm$^{-1}$ after the bromination. 1536.86 cm$^{-1}$ and 1515.11 cm$^{-1}$ were attributable to the —C=C— stretching of the aromatic ring before and after bromination, respectively.

For type II PU, N—H vibration appeared at 3292.78 cm$^{-1}$ and 3392.50 cm$^{-1}$ for the polymer before and after bromination, respectively. 1600.92-1724.36 cm$^{-1}$ vibration for C=O of the initial. PU before bromination shifted to 1644.85-1705.31 cm$^{-1}$ after the bromination. 1534.15 cm$^{-1}$ and 1520.25 cm$^{-1}$ were attributable to the —C=C— stretching of the aromatic ring before and after bromination, respectively. N—H vibration appears at 3291.37 cm$^{-1}$ and 3369.81 cm$^{-1}$ for the polymer before and after.

For type HI PU, N—H vibration appeared at 3291.37 cm$^{-1}$ and 3369.81 cm$^{-1}$ for the polymer before and after bromination, respectively. 1640.13-1723.40 cm$^{-1}$ vibration for C=O of the initial PU before bromination shifted to 1641.79-1716.51 cm$^{-1}$ after the bromination. 1533.16 cm$^{-1}$ and 1532.84 cm$^{-1}$ were attributable to the —C=C— stretching of the aromatic ring before and after bromination, respectively.

The stability of these brominated polyurethane sponges under a storage condition at (4-8)° C. was monitored for 24 months. Elemental. analysis showed less than 3% of the bromine was released during this period, indicating a high stability profile (Table 8).

TABLE 8

Elemental analysis of the crosslinked brominated polyurethane under storage condition for 24 month at (4-8)° C.

| P.U type and storage conditions | C % | H % | N % | Br % |
|---|---|---|---|---|
| Type I - After bromination | 41.02 | 5.20 | 3.6 | 24.41 |
| Type I - After bromination, stored for 24 months | 40.16 | 5.56 | 3.93 | 21.53 |
| Type II - After bromination | 32.36 | 5.59 | 2.77 | 21.95 |
| Type II - After bromination, stored for 24 months | 31.57 | 6.13 | 3.15 | 20.25 |
| Type III - After bromination | 50.02 | 6.23 | 4.90 | 21.95 |
| Type III - After bromination, stored for 24 months | 49.58 | 6.50 | 5.30 | 17.53 |

*C, H, N, and Br content of brominated PU (% C, % H, % N ± 0.3%, % Br ± 0.5%).

Following the stability study, the HOBr release from these sponges was monitored in a constant volume at different levels of pH. Table 9 shows representative release data for 1 week for polyurethane type I in a constant volume versus pH levels. There was a slight decrease in the bromine content (starting 21.53%) of the polymer after release at different PH values, with the most significant decrease in Br seen at pH=1 or at pH=10 by approximately 1.5-2.5% decrease.

TABLE 9

Elemental analysis of type I PU following release study for 1 week in response to different pH levels

| pH Value | C % | H % | N % | Br % |
|---|---|---|---|---|
| 1 | 40.91 | 5.53 | 4.20 | 20.09 |
| 3 | 41.12 | 5.51 | 4.24 | 20.06 |

TABLE 9-continued

Elemental analysis of type I PU following release study for 1 week in response to different pH levels

| pH Value | C % | H % | N % | Br % |
|---|---|---|---|---|
| 5 | 40.88 | 5.39 | 4.18 | 21.07 |
| 7 | 41.32 | 5.39 | 4.23 | 20.21 |
| 10 | 41.41 | 5.22 | 4.23 | 19.34 |

*C, H, N, and Br content of brominated PU (% C, % H, % N ± 0.3%, % Br ± 0.5%).

The brominated materials exhibited continuous hypobromous acid release above the antimicrobial active levels (Br+>0.1 ppm) for the studied period, as indicated by sampling after 96 h and 1 week, shown in Table 10 and Table 11, respectively.

TABLE 10

Concentration of the oxidative bromine (HOBr) in different pH after 96 hours of release at 25° C.

| pH Value | HOBr Con. (ppm) | pH Value after 96 h |
|---|---|---|
| 3 | 1.864 | 2 |
| 5 | 2.186 | 2 |
| 7 | 1.864 | 2 |
| 10 | 1.125 | 2 |
| 7 (for Control) | No HOBr release | |

TABLE 11

Concentration of the oxidative bromine (HOBr) in different pH after one week.

| pH Value | HOBr Con. (ppm) |
|---|---|
| 3 | 1.362 |
| 5 | 1.362 |
| 7 | 1.339 |
| 10 | 1.572 |
| 7 (for Control) | No HOBr release |

FTIR spectra of the samples after release study at 96 hours' time point showed minor change in the vibration of functional groups, which indicated the slow release of HOBr. All of the data indicated a possibility of extended controlled release for at least several weeks or in a large volume above bioactive levels of 0.1 ppm HOBr.

Example 7

Figure 7:
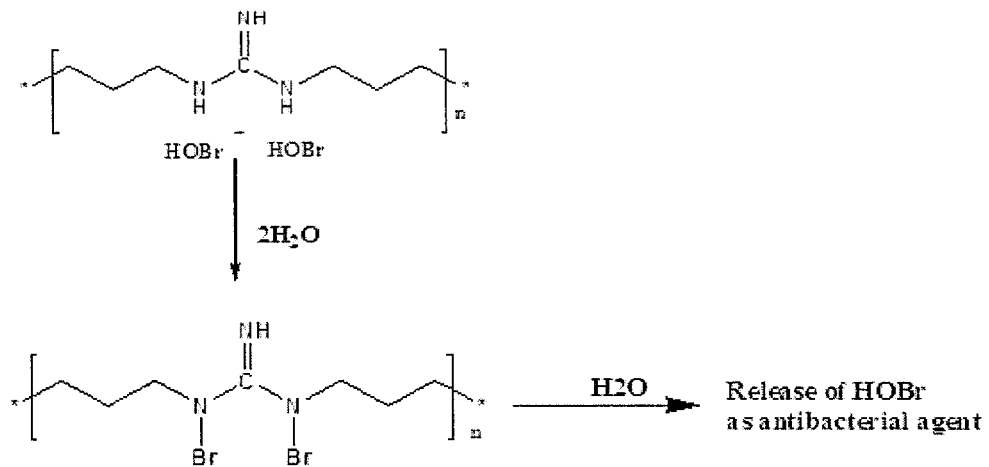
FIG. 7 is a schematic representation of the bromination reaction and hydrolysis of brominated polyhexamethylene guanidine (PHMG).

Bromination of Polyhexamethylene Guanidine (PHMG) and its Copolymer with Polyethyleneimine Materials and Methods Polyhexamethylene guanidine (PHMG) hydrochloride was a cationic polymeric biocide used as an antibacterial agent. FIG. 7 shows the synthesis scheme of brominated PHMG by reacting PHMG with hypobromous acid in pH-7. The reaction was conducted in two different molar ratios, 1:4 and 1:20, of HOBr per NH site in the polymer. The synthesized PHMG-Br was characterized compared with the starting material PHMG, by $^1$H-NMR (in deuterated DMSO), FTIR, and Elemental Analysis.

Similar to PHMG bromination, guanidine polymers and copolymers were also brominated to form stable biocidal materials releasing HOBr.

Figure 8:
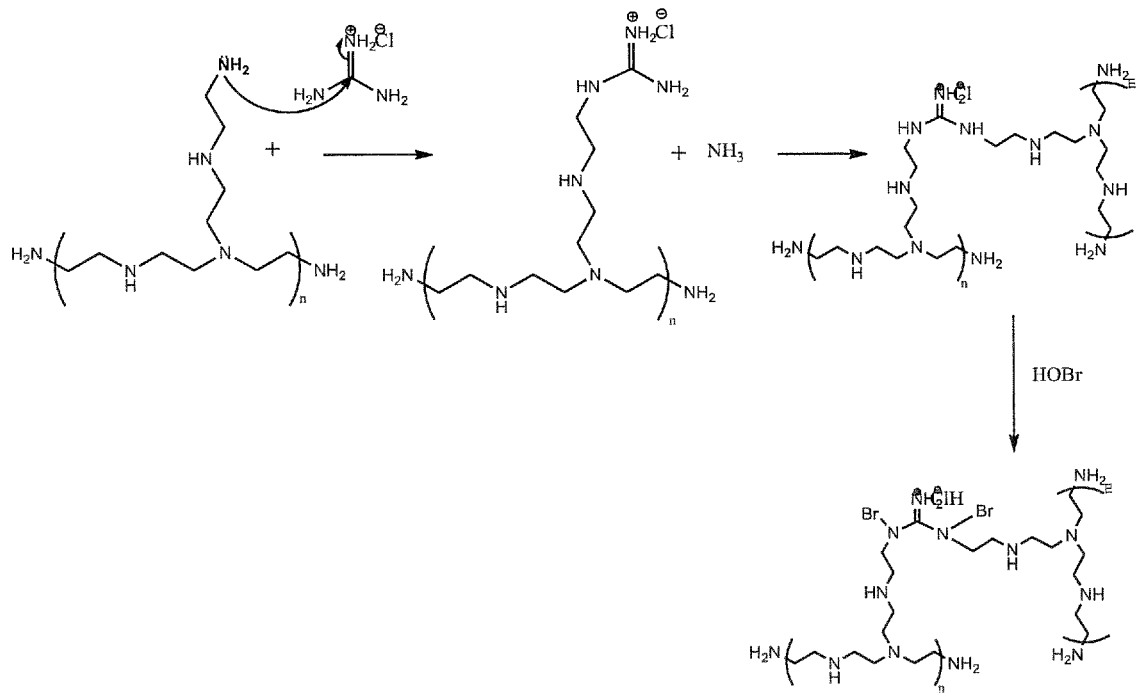
FIG. 8 is a schematic representation of polyethyleneimine modifications including crosslinking, copolymerization with guanidine hydrochloride and bromination.

FIG. 8 shows a series of polyethyleneimine:guandine modification/crosslinking/copolymerization. At different ratios, polymers were synthesized followed by bromination.

Results

Table 12 shows both the higher and the lower reaction ratios were effective in brominating PHMG.

TABLE 12

Elemental analysis of PHMG before and after bromination in different molar ratios of reactive sites:bromine.

| | C % | H % | N % | Cl % | Br % |
|---|---|---|---|---|---|
| PHMG pure | 40.8 | 9.94 | 16.76 | 22.65 | — |
| PHMG-Br 50% | 37.58 | 8.80 | 13.40 | 4.38 | 23.63 |
| PHMG-Br 10% | 36.05 | 8.08 | 15.34 | 7.32 | 13.47 |

$^1$H-NMR analysis confirmed bromination of PHMG. A visible decrease in the solubility of the brominated. PHMG was noticed. Before bromination, integration values of protons at different locations as labeled in formula 9 were: a=4, b=3.93, C=4, and d=5. After bromination, integration values of protons at different locations as labeled in formula 10 were: a=4, b=3.93, C=3,33, and d=2.40. The degree of bromination was over 50% of the NH groups along the polymer chain.

Formula 9

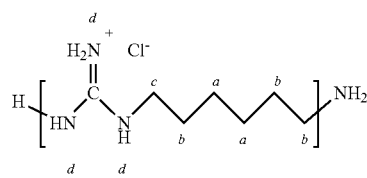

Formula 10

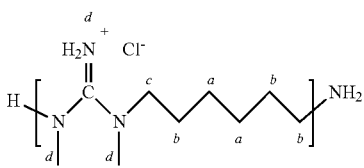

FTIR analysis showed the bromination of PHMG was achieved and

HOBr release could be achieved. Due to bromination, the NH vibration was shifted to a low wave number as the % Br increased, and CN shifted to a low wave number (low frequency) as the % Br increased. For PHMG before bromination, the vibrations of ʹ(NH), δ(NH) and (C=N) appeared at 3149.76 cm$^{-1}$, 1632.40 cm$^{-1}$, respectively. After Bromination, ʹ(NH), δ(NH) and (C=N) appeared at 3170.25 cm$^{-1}$, 1627.23 cm$^{-1}$, respectively.

Elemental analysis showed the yielded Br% was 6-20%, and confirmed the bromination of PHMG, as shown in Table 13. This high % of Br could be utilized for extended release of HOBr.

TABLE 13

Elemental Analysis of PHMG before and after bromination.

| Sample | % C | % H | % N | % Br |
|---|---|---|---|---|
| PHMG | 41.29 | 8.53 | 23.80 | 0.00 |
| PHMG-Br | 42.32 | 8.45 | 20.54 | 15.73 |

*C, H, N, Br - of PHMG before and after Bromiantion-% C, % H, % Br ± 0.5%.

Polyethyleneimine was modified to crosslink and copolymerized with guandine hydrochloride, followed by bromination, as shown in FIG. 8. Elemental analysis confirmed 6-20% Br in the formed copolymer.

Example 8

Bromination of Polyurea

Materials and Methods

Figure 9:
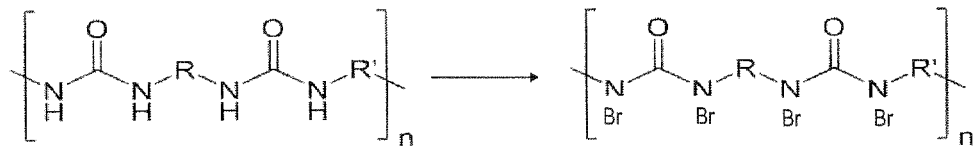
FIG. 9 a schematic representation of the bromination of polyurea.

Polyurea was synthesized, and FIG. 9 shows the reaction scheme to brominate polyurea to yield a Br releasing polymer.

Results

Elemental analysis showed 13-25% Br in the brominated polyurea. These synthesized and brominated materials were found to behave similarly to polyurethane and exhibited elongated release profile of HOBr in aqueous media under different conditions.

Example 9

Bromination of Polyamides (Nylon)

Materials and Methods

Polyamides due to the repeating unit —CONH— was found accessible for bromination under the same condition as applied in preceding examples for uracil/hydantoin/polyurethane/polyguandines and polyurea.

Results

Figure 10:
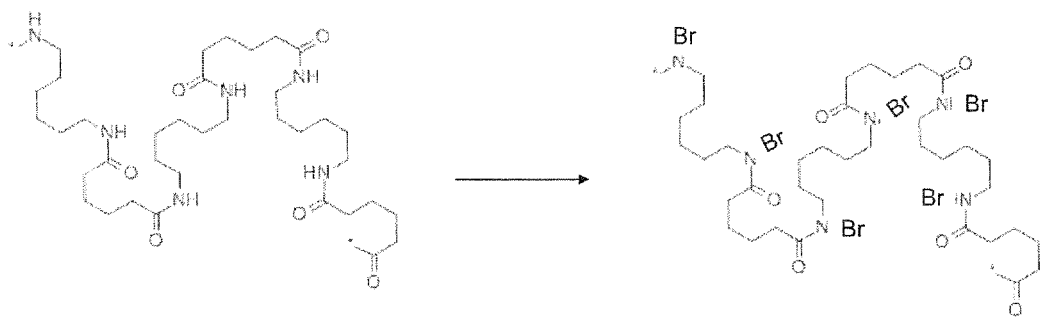
FIG. 10 a schematic representation of the bromination of polyamide.

Brominated polyamide was yielded to stably controlled release HOBr. FIG. 10 shows a polyamide, Nylon 6,6, was brominated. Different ratios of Br to active sites were tested. Elemental analysis confirmed 18-30% Br in the modified polymer.

For brominated polyurethane spongies and the other developed brominated polymers, an extended releasing profile of oxidative halogen was recorded increasing their value in disinfection application by one pre-step of halogen loading.

Example 10

Halogenation of Acrylamide Copolymers and Beads

The acrylamide copolymers, poly(diallydimethylammonium chloride, poly(acrylamide-co-acrylic acid) and crosslinked polyacrylamide beads (obtained from catalog such as obtained from Sigma-Aldrich) were dissolved or dispersed in water at a concentration of 10% w/v and an equivalent molar amount (to the acrylamide units in the polymer) of HOBR or HOCl aqueous solution (5% w/v solution in water) were mixed and stirred for 5 hours and the soluble polymers were isolated either by precipitation with adding excess methanol or by drying the sample. The beads were isolated by filtration. Over 50% of the acrylamide unites were brominated or chlorinated. The soluble polymers were effective as flocculants when tested on the purification of scrubber water samples and possess antimicrobial activity when exposed to *E. coli* using standard test.

In another experiment, hydroxamic acid derivative copolymers with acrylamide polymers described above prepared from the reaction of half equivalent of hydroxalamine hydrochloride to the acrylamide unites at pH>13 at room temperature for 6 hours were brominated using a similar procedure as above but with half the amount of reacting HOBr. Over 60% of the acrylamide residues in the polymer were converted into N-bromo derivative groups. These polymeric derivatives that contained hydroxamic acid and N—Br derivatives along the polymer chain possessed high affinity to iron ions as well as high antimicrobial activity.

Similar to the above, soluble and crosslinked polyacrylamide solution or beads were reacted with Hydroxylamine to form poly(acryl hydroxamic acid). Poly(N-Bromo acrylamide) was prepared from the reaction with HOBr. Mixtures of these polymers: polyacrylamide, poly(acryl hydroxamic acid) and poly(N-Bromo acrylamide) provided a composition of tri-function activities, i.e., flocculant, iron chelator, and flocculant and antimicrobial activity, The ratio of the components determines the relative reactivity of each function of the mixture.

We claim:

1. An N-halamine polymer:
   wherein one or more amide groups, one or more guanidino groups, one or more groups derived from urethane or urea, or a combination thereof, are halogenated to form nitrogen-halogen covalent bonds,
   wherein
   (a) the N-halamine polymer comprises repeating units, wherein each of the repeating units comprises a structure within the parenthesis of Formula 1 or Formula 2:

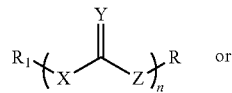

Formula 1

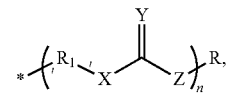

Formula 2 wherein Y, independently in each repeating unit, is S, NH or O;
wherein X, independently in each repeating unit, is $CR_2$, O, NH, N—Br, or N—Cl;
wherein Z, independently in each repeating unit, is NH, N—Br, or N—Cl;
wherein $R_1$ is from a polymer carrier or an alkyl group; and
wherein R and $R_2$ are independently alkyl groups;
(b) the N-halamine polymer has a structure defined by Formula 3 or Formula 8:

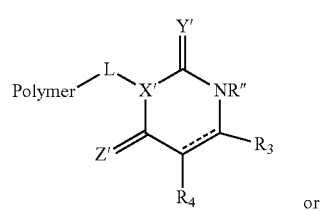

Formula 3 or

-continued

Formula 8

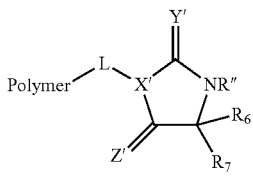

wherein L is absent or a linker;
wherein X' is N or CR, and R is as defined above;
wherein Y' and Z' are independently O, S, or NR';
wherein R" is H, Cl, or Br; and
wherein R', $R_3$, $R_4$, $R_6$, and $R_7$ are independently hydroxyl, hydrogen, amino, thiol, oxo, phosphate, or substituted or unsubstituted $C_1$-$C_{10}$ alkyl, $C_1$-$C_{10}$ alkylene, $C_2$-$C_{10}$ alkenyl, $C_2$-$C_{10}$ alkynyl, $C_1$-$C_{10}$ alkoxy, $C_1$-$C_{10}$ alkylamino, $C_1$-$C_{10}$ alkylthio, $C_1$-$C_{10}$ carbonyl, $C_1$-$C_{10}$ carboxyl, $C_1$-$C_{10}$ amido, $C_1$-$C_{10}$ sulfonyl, $C_1$-$C_{10}$ sulfonic acid, $C_1$-$C_{10}$ sulfamoyl, $C_1$-$C_{10}$ sulfoxide, $C_1$-$C_{10}$ phosphoryl, or $C_1$-$C_{10}$ phosphonyl,
wherein substituents are independently hydroxyl, amino, thiol, oxo, phosphate, or substituted or unsubstituted $C_1$-$C_{10}$ alkyl, $C_1$-$C_{10}$ alkylene, $C_2$-$C_{10}$ alkenyl, $C_2$-$C_{10}$ alkynyl, $C_1$-$C_{10}$ alkoxy, $C_1$-$C_{10}$ alkylamino, $C_1$-$C_{10}$ alkylthio, $C_1$-$C_{10}$ carbonyl, $C_1$-$C_{10}$ carboxyl, $C_1$-$C_{10}$ amido, $C_1$-$C_{10}$ sulfonyl, $C_1$-$C_{10}$ sulfonic acid, $C_1$-$C_{10}$ sulfamoyl, $C_1$-$C_{10}$ sulfoxide, $C_1$-$C_{10}$ phosphoryl, or $C_1$-$C_{10}$ phosphonyl;
or
(c) the N-halamine polymer comprises the repeating units of (a) as the polymer of Formula 3 or Formula 8 of (b).

2. The N-halamine polymer of claim 1, wherein the halogen is Cl, Br, or both.

3. The N-halamine polymer of claim 1, having a structure defined by the repeating unit comprising the structure within the parenthesis of Formula 1 or Formula 2.

4. The N-halamine polymer of claim 1, wherein the one or more groups derived from urea are halogenated to have a structure defined by the following formula:

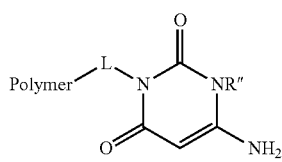

wherein L is absent or a linker; R" is Cl or Br.

5. The N-halamine polymer of claim 1, wherein the one or more groups derived from urea are halogenated to have a structure defined by the following formula:

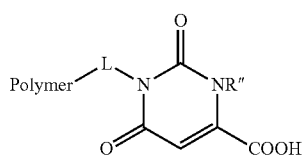

Wherein L is absent or a linker; R" is Cl or Br.

6. The N-halamine polymer of claim 1, wherein the one or more groups derived from urea are halogenated to have a structure defined by the following formula:

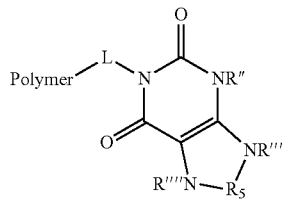

wherein L is absent or a linker; R", R''', and R'''' are independently H, Cl, or Br, and at least one of R", R''', and R'''' is Cl or Br; $R_5$ is O, S, NH, N—Br, N—Cl, carbonyl, oran alkyl group.

7. The N-halamine polymer of claim 6, wherein $R_5$ is C=O.

8. The N-halamine polymer of claim 1, wherein the one or more groups derived from urea are halogenated to have a structure defined by the following formula:

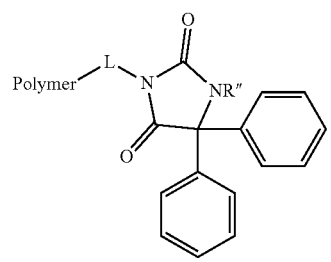

wherein L is absent or a linker; R" is Cl or Br.

9. The N-halamine polymer of claim 1, wherein the one or more groups derived from urea are halogenated to have a structure defined by the following formula:

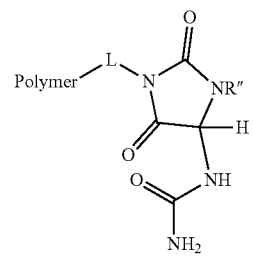

wherein L is absent or a linker; R" is Cl or Br.

10. The N-halamine polymer of claim 1, wherein the polymer is a halogenated polyurea, polyurethane, polyguanidine, polyamide, polyacrylamide and polymethacrylamide, copolymer or block polymer thereof, or a mixture thereof.

11. The N-halamine polymer of claim 1, wherein the weight percent of halogen is between 10% and 70% of the polymer.

12. The N-halamine polymer of claim 1, wherein the halogen is released in the form of an oxidative halogen or a hypohalous acid, upon polymer contact with water, in an effective amount to inhibit and reduce microbes in the water.

13. A microparticle, nanoparticle, bead, sponge, gel, foam, resin, or membrane, comprising the N-halamine polymer of claim 1.

14. A method of preparing the N-halamine polymer of claim 1 comprising immersing a polymer in an aqueous solution of hypohalous acid, wherein the polymer contains one or more amide groups, guanidino groups, urethane groups, urea groups, or a combination thereof.

15. The method of claim 14, wherein the polymer comprises polyurea, polyurethane, polyguanidine, polyamide, polyacrylamide, polymethacrylamide, or copolymer or block polymer thereof, and the hypohalous acid is hypobromous acid or hypochlorous acid.

16. A method of removing or reducing the amount of microbes, toxic chemicals, or both from contaminated water, comprising contacting the contaminated water with the N-halamine polymer of claim 1.

17. A method of removing or reducing the amount of microbes, toxic chemicals, or both from contaminated water, comprising contacting the contaminated water with the microparticle, nanoparticle, bead, sponge, gel, foam, resin, or membrane of claim 13.

18. The method of claim 16, wherein the amount of microbes is reduced by at least 2-fold in the log scale.

19. The method of claim 16, wherein the N-halamine polymer comprises brominated or chlorinated polyurethane.

20. The method of claim 16, wherein the N-halamine polymer comprises brominated or chlorinated polyamides.

21. The method of claim 20, wherein the N-halamine polymer comprises brominated or chlorinated polyacrylamide or its copolymers.

22. A method of removing or reducing the amount of microbes, toxic chemicals, or both from contaminated water, comprising contacting the contaminated water with a mixture of polyacrylamide, poly(acryl hydroxamic acid), and poly(N-Bromo acrylamide) or poly(N-chloro acrylamide).

* * * * *